US011516823B2

(12) United States Patent
Wei et al.

(10) Patent No.: US 11,516,823 B2
(45) Date of Patent: Nov. 29, 2022

(54) EMTC COEXISTENCE BETWEEN RADIO ACCESS TECHNOLOGIES

(71) Applicant: QUALCOMM Incorporated, San Diego, CA (US)

(72) Inventors: Chao Wei, Beijing (CN); Alberto Rico Alvarino, San Diego, CA (US); Le Liu, Fremont, CA (US); Umesh Phuyal, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/250,210

(22) PCT Filed: Jun. 6, 2019

(86) PCT No.: PCT/CN2019/090248
§ 371 (c)(1),
(2) Date: Dec. 15, 2020

(87) PCT Pub. No.: WO2019/237987
PCT Pub. Date: Dec. 19, 2019

(65) Prior Publication Data
US 2021/0258978 A1 Aug. 19, 2021

(30) Foreign Application Priority Data
Jun. 15, 2018 (WO) ................ PCT/CN2018/091490

(51) Int. Cl.
*H04W 72/12* (2009.01)
*H04B 1/713* (2011.01)
(Continued)

(52) U.S. Cl.
CPC ........ *H04W 72/1215* (2013.01); *H04B 1/713* (2013.01); *H04L 5/0048* (2013.01); *H04W 68/005* (2013.01); *H04W 72/042* (2013.01)

(58) Field of Classification Search
CPC .......................... H04L 5/0048; H04W 72/042; H04W 68/005; H04W 72/1215; H04B 1/713
(Continued)

(56) References Cited

U.S. PATENT DOCUMENTS 9,253,782 B2  2/2016  Xu et al.
10,080,244 B2  9/2018  Lei et al.
(Continued)

FOREIGN PATENT DOCUMENTS

EP  3439369 A1  2/2019
WO  2013170097 A1  11/2013
(Continued)

OTHER PUBLICATIONS

Supplementary European Search Report—EP19820263—Search Authority—The Hague—dated Feb. 16, 2022.
(Continued)

*Primary Examiner* — Rownak Islam
(74) *Attorney, Agent, or Firm* — Harrity & Harrity, LLP

(57) ABSTRACT

Some techniques and apparatuses described herein allocate and/or transmit a narrower bandwidth value for LTE MTC UEs, such as UEs that operate in a small bandwidth mode using LTE procedures, and allocate and/or transmit a wider bandwidth value for 5G MTC UEs, such as UEs that can perform hopping and/or be allocated resources outside of a legacy bandwidth. For example, the wider bandwidth value may be associated with a non-LTE carrier (e.g., a 5G carrier in a 5G bandwidth) with the same center frequency as an LTE carrier associated with the narrower bandwidth value. Some techniques and apparatuses described herein provide
(Continued)

for initial access, signaling, paging, random access, unicast communications, frequency hopping, cell-specific reference signaling, narrowband alignment, and/or other coexistence considerations for LTE MTC UEs operating on an LTE carrier and 5G MTC UEs operating on a non-LTE carrier with a bandwidth that includes the LTE carrier.

30 Claims, 14 Drawing Sheets

(51) Int. Cl.
*H04L 5/00* (2006.01)
*H04W 68/00* (2009.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2014/0169325 A1 | 6/2014 | Ratasuk et al. | |
| 2015/0230249 A1* | 8/2015 | Nguyen | H04W 72/042 370/329 |
| 2016/0134403 A1* | 5/2016 | Xiong | H04W 4/70 370/329 |
| 2017/0332357 A1 | 11/2017 | Xu et al. | |
| 2018/0049213 A1 | 2/2018 | Gholmieh et al. | |
| 2018/0368199 A1* | 12/2018 | Zeng | H04W 72/0453 |
| 2019/0021081 A1* | 1/2019 | Ljung | H04L 5/0044 |
| 2021/0218502 A1* | 7/2021 | Park | H04W 72/042 |
| 2022/0095385 A1* | 3/2022 | Yi | H04W 74/0833 |

FOREIGN PATENT DOCUMENTS

| | | | |
|---|---|---|---|
| WO | 2017040147 A1 | 3/2017 | |
| WO | 2017108111 A1 | 6/2017 | |
| WO | 2017121613 A1 | 7/2017 | |
| WO | 2017170448 A1 | 10/2017 | |
| WO | WO-2018059168 A1 * | 4/2018 | H04L 5/00 |

OTHER PUBLICATIONS

Catt: "Further Issues With Switching of Bandwidth Part And Random Access", 3GPP Draft, 3GPP TSG-RAN WG2#102, R2-1806991, Further Issues With Switching of Bandwidth Part And Random Access, 3rd Generation Partnership Project (3GPP), Mobile Competence Centre, 650, Route Des Lucioles, F-06921, Sophia-Antipolis Cedex, France, vol. RAN WG2, No. Busan, Korea, May 21, 2018-May 25, 2018, May 11, 2018 (May 11, 2018), XP051464488, pp. 1-6, Retrieved from the Internet: URL: http://www.3gpp.org/ftp/tsg%5Fran/WG2%5FRL2/TSGR2%5F102/Docs [retrieved on May 11, 2018] paragraph [02. 3].
International Search Report and Written Opinion—PCT/CN2018/091490—ISA/EPO—dated Mar. 6, 2019.
International Search Report and Written Opinion—PCT/CN2019/090248—ISA/EPO—dated Aug. 1, 2019.

* cited by examiner

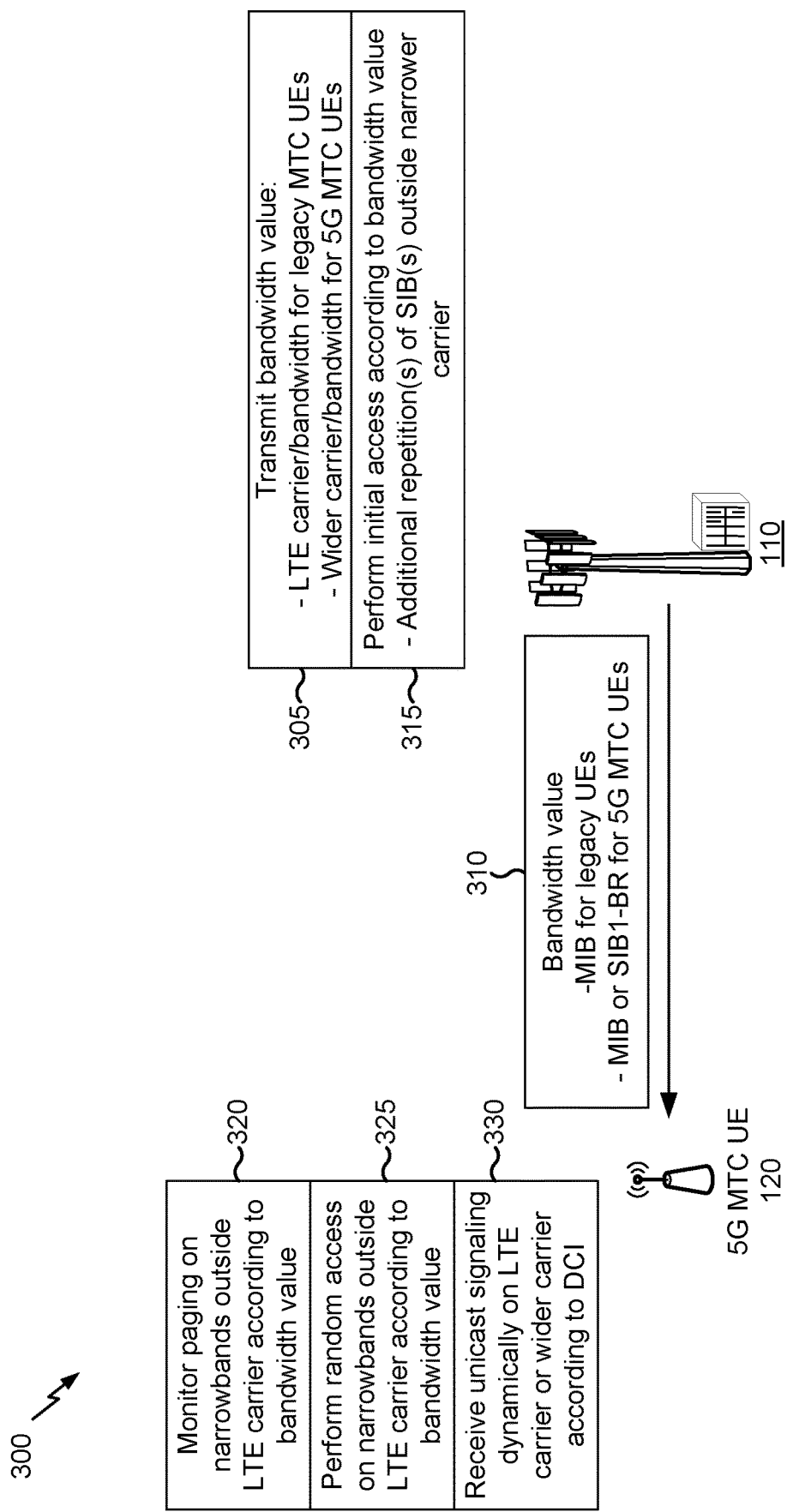

EMTC COEXISTENCE BETWEEN RADIO ACCESS TECHNOLOGIES

CROSS-REFERENCE TO RELATED APPLICATIONS

This application is a 371 national stage of PCT Application No. PCT/CN2019/090248 filed on Jun. 6, 2019, entitled "EMTC COEXISTENCE BETWEEN RADIO ACCESS TECHNOLOGIES," which claims priority to PCT Application Number PCT/CN2018/091490, filed on Jun. 15, 2018, entitled "TECHNIQUES AND APPARATUSES FOR EMTC OPERATION IN A NON-LTE BANDWIDTH," which are hereby expressly incorporated by reference herein.

BACKGROUND

Field

Aspects of the present disclosure generally relate to wireless communication, and more particularly to techniques and apparatuses for enhanced machine-type communication (eMTC) coexistence between radio access technologies (RATs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Enhanced machine-type communication (eMTC) is a framework for low-power and wide-area communication between UEs, such as UEs associated with Internet of Things (IoT) devices. In an LTE deployment, eMTC can be deployed in the LTE spectrum and coexist with other LTE services within the same bandwidth. The eMTC UE may communicate within a bandwidth corresponding to a narrowband of six consecutive physical resource blocks (PRBs), and may switch the narrowband between subframes (i.e., may perform frequency hopping between narrowbands). The LTE primary synchronization signal (PSS), secondary synchronization signal (SSS), and physical broadcast channel (PBCH) may be confined within the narrowband by design, and thus may be reused by LTE eMTC for cell acquisition. The information for a system information block 1-bandwidth reduced (BR) (SIB1-BR) (e.g., transport block size, repetition pattern, etc.) may be signaled in a master information block (MIB) of the PBCH. In that case, the SIB1-BR may include scheduling information for the remaining system information blocks (SIBS) that are relevant for eMTC UEs.

Some eMTC devices may be deployed in a 5G band (e.g., in a 5G carrier that includes an LTE bandwidth). For example, these eMTC devices may include legacy devices (e.g., LTE eMTC devices) and devices that can use more flexible bandwidth and resource allocations (e.g., 5G eMTC devices). There may be a tradeoff regarding the bandwidth of the LTE cell in which the eMTC UE operates. For example, with a larger bandwidth, more UEs can be scheduled, and frequency diversity may be improved due to frequency hopping. With a smaller bandwidth, it may be easier to handle coexistence with 5G, with or without frequency hopping. For example, the cell-specific reference signal bandwidth can be smaller with a smaller bandwidth, thereby using less resources of the 5G carrier.

Some techniques and apparatuses described herein allocate and/or transmit a narrower bandwidth value for LTE MTC UEs, such as UEs that operate in a small bandwidth mode (e.g., 1.4 MHz, 3 MHz, 5 MHz, and/or the like) using LTE procedures, and allocate and/or transmit a wider bandwidth value for 5G MTC UEs, such as UEs that can perform hopping and/or use resources outside of a legacy bandwidth. For example, the wider bandwidth value may be associated with a non-LTE carrier (e.g., a 5G carrier in a 5G bandwidth) with the same center frequency as an LTE carrier associated with the narrower bandwidth value. Some techniques and apparatuses described herein provide for initial access, signaling, paging, random access, unicast communications, frequency hopping, cell-specific reference signaling, narrowband alignment, and/or other coexistence considerations for LTE MTC UEs operating on an LTE carrier and 5G MTC UEs operating on a non-LTE carrier with a bandwidth that includes the LTE carrier. Thus, coexistence of LTE MTC UEs and 5G MTC UEs is provided in a 5G band that includes an LTE carrier for the LTE MTC UEs.

In an aspect of the disclosure, a method, a UE (e.g., an MTC UE), a base station, an apparatus, and a computer program product are provided.

In some aspects, the method may by performed by a base station. The method may include transmitting a bandwidth value for an MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicating with the MTC UE using the bandwidth value.

In some aspects, the base station may include a memory and one or more processors operatively coupled to the memory. The memory and the one or more processors may be configured to transmit a bandwidth value for an MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicate with the MTC UE using the bandwidth value.

In some aspects, the apparatus may include means for transmitting a bandwidth value for an MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and means for communicating with the MTC UE using the bandwidth value.

In some aspects, the computer program product may include a non-transitory computer-readable medium storing one or more instructions. The one or more instructions, when executed by one or more processors of a base station, may cause the one or more processors to transmit a bandwidth value for an MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicate with the MTC UE using the bandwidth value.

In some aspects, the method may by performed by an MTC UE. The method may include receiving information identifying a bandwidth value for the MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicating using the bandwidth value.

In some aspects, the MTC UE may include a memory and one or more processors operatively coupled to the memory. The memory and the one or more processors may be configured to receive information identifying a bandwidth value for the MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicate using the bandwidth value.

In some aspects, the apparatus may include means for receiving information identifying a bandwidth value for the apparatus, wherein the bandwidth value is a first bandwidth value when the apparatus is configured to use a first carrier associated with a first radio access technology, and wherein the bandwidth value is a second bandwidth value when the apparatus is configured to use a second carrier associated with a second radio access technology; and means for communicating using the bandwidth value.

In some aspects, the computer program product may include a non-transitory computer-readable medium storing one or more instructions. The one or more instructions, when executed by one or more processors of an MTC UE, may cause the one or more processors to receive information identifying a bandwidth value for the MTC UE, wherein the bandwidth value is a first bandwidth value when the MTC UE is configured to use a first carrier associated with a first radio access technology, and wherein the bandwidth value is a second bandwidth value when the MTC UE is configured to use a second carrier associated with a second radio access technology; and communicate using the bandwidth value.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 3A and 3B are diagrams illustrating an example of configuration of legacy and 5G MTC UEs to operate in a 5G carrier.

DETAILED DESCRIPTION

Figure 1:
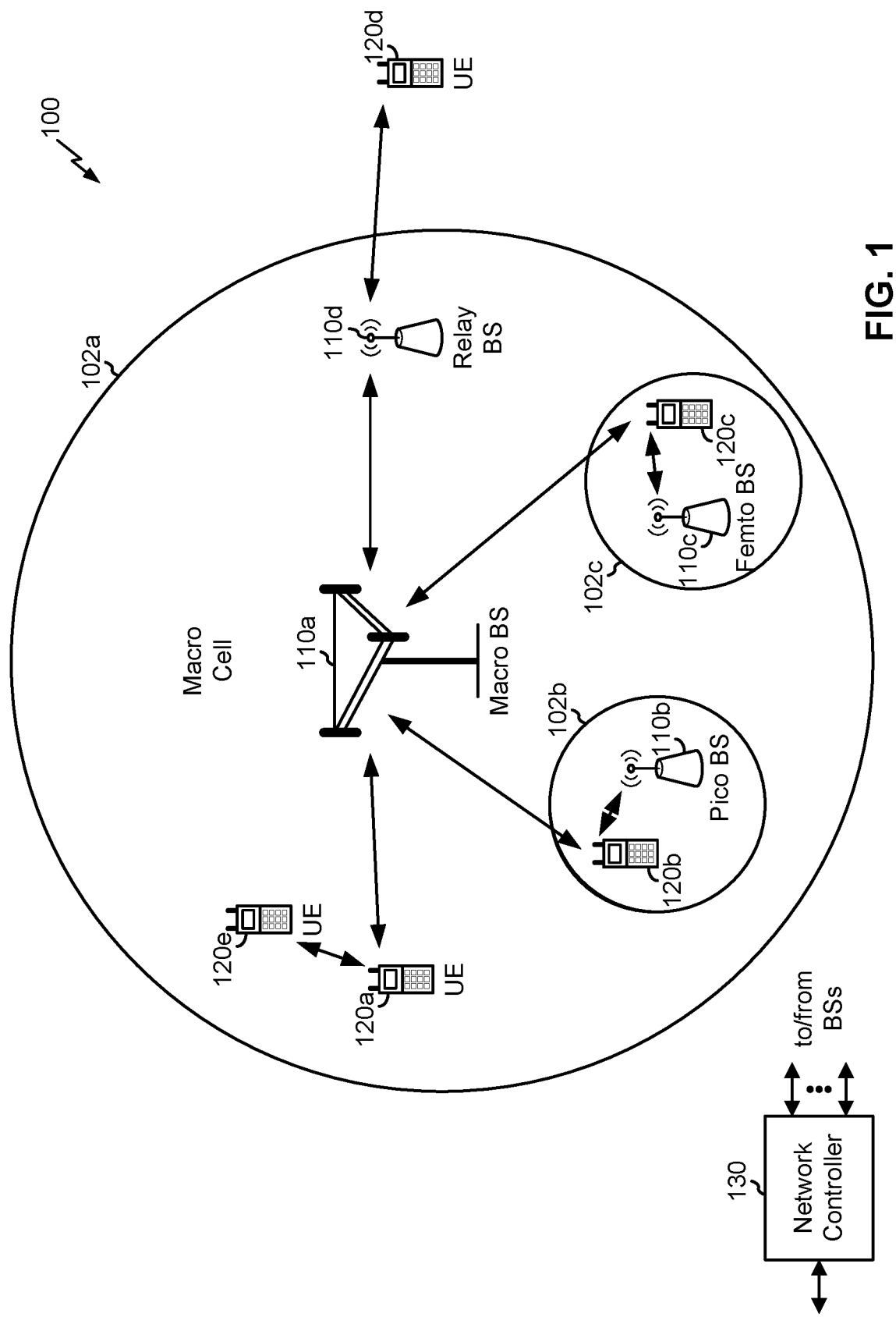
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

An LTE MTC UE is an MTC UE that operates only within an LTE bandwidth following legacy procedures. For example, frequency hopping, signaling, scheduling, etc. for an LTE MTC UE may be confined to the LTE bandwidth. A 5G MTC UE is a UE that can use more flexible bandwidth and resource allocations than an LTE MTC UE outside an LTE bandwidth. For example, a 5G MTC UE may be capable of frequency hopping, scheduling, and communicating data outside of the LTE bandwidth. In some aspects, the larger bandwidth may be associated with a non-LTE carrier (e.g., a 5G carrier or another type of carrier) with the same center frequency as the LTE carrier.

Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided as an example. Other examples may differ from what is described with regard to FIG. 1.

Figure 2:
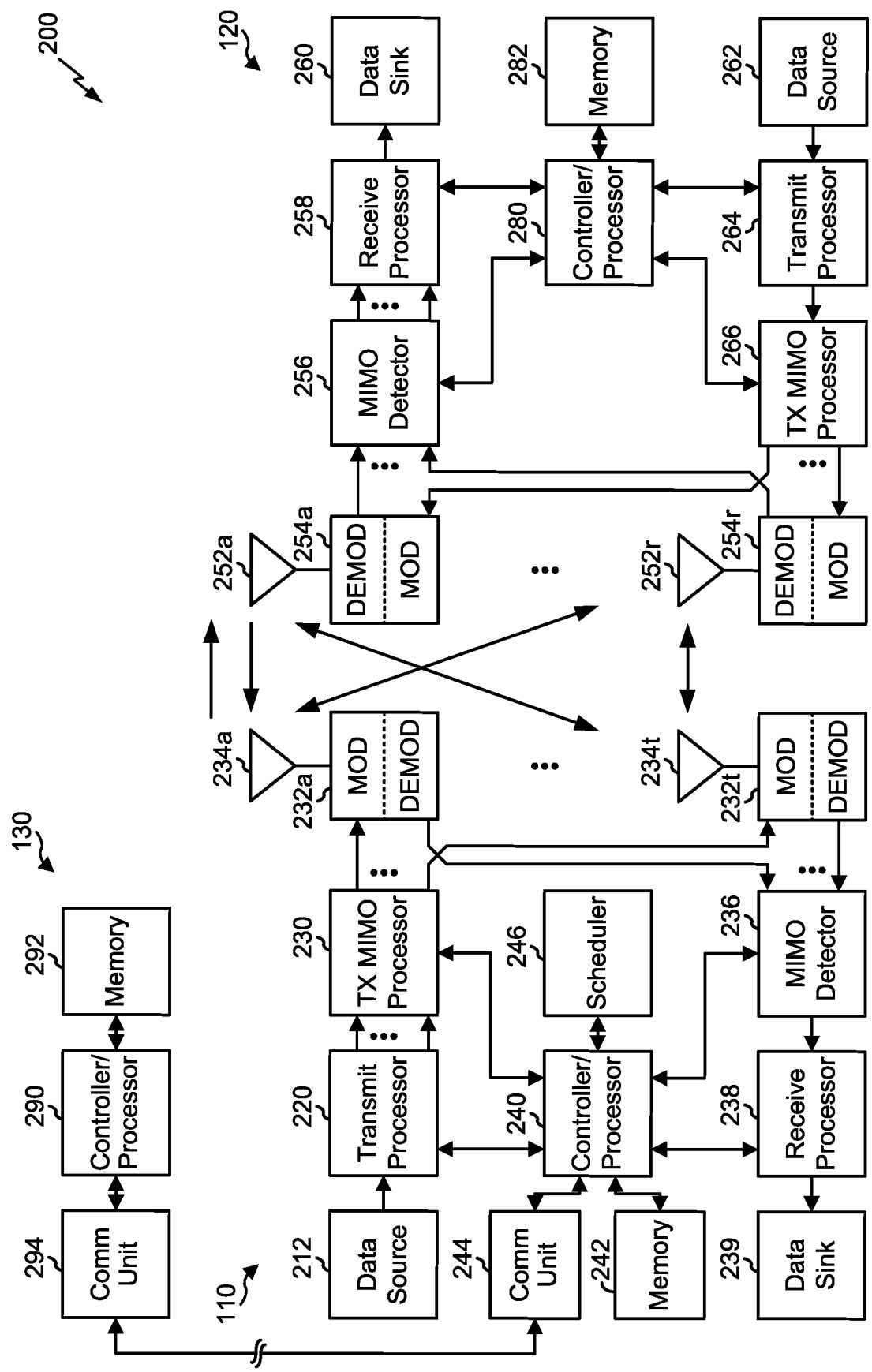
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer transmitting, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with eMTC operation on a non-LTE bandwidth, as described in more detail elsewhere herein. For example, controller/processor 240 of base station 110, controller/processor 280 of UE 120, and/or any other component(s) of FIG. 2 may perform or direct operations of, for example, method 800 of FIG. 8, method 1100 of FIG. 11, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided as an example. Other examples may differ from what is described with regard to FIG. 2.

Figure 3B:
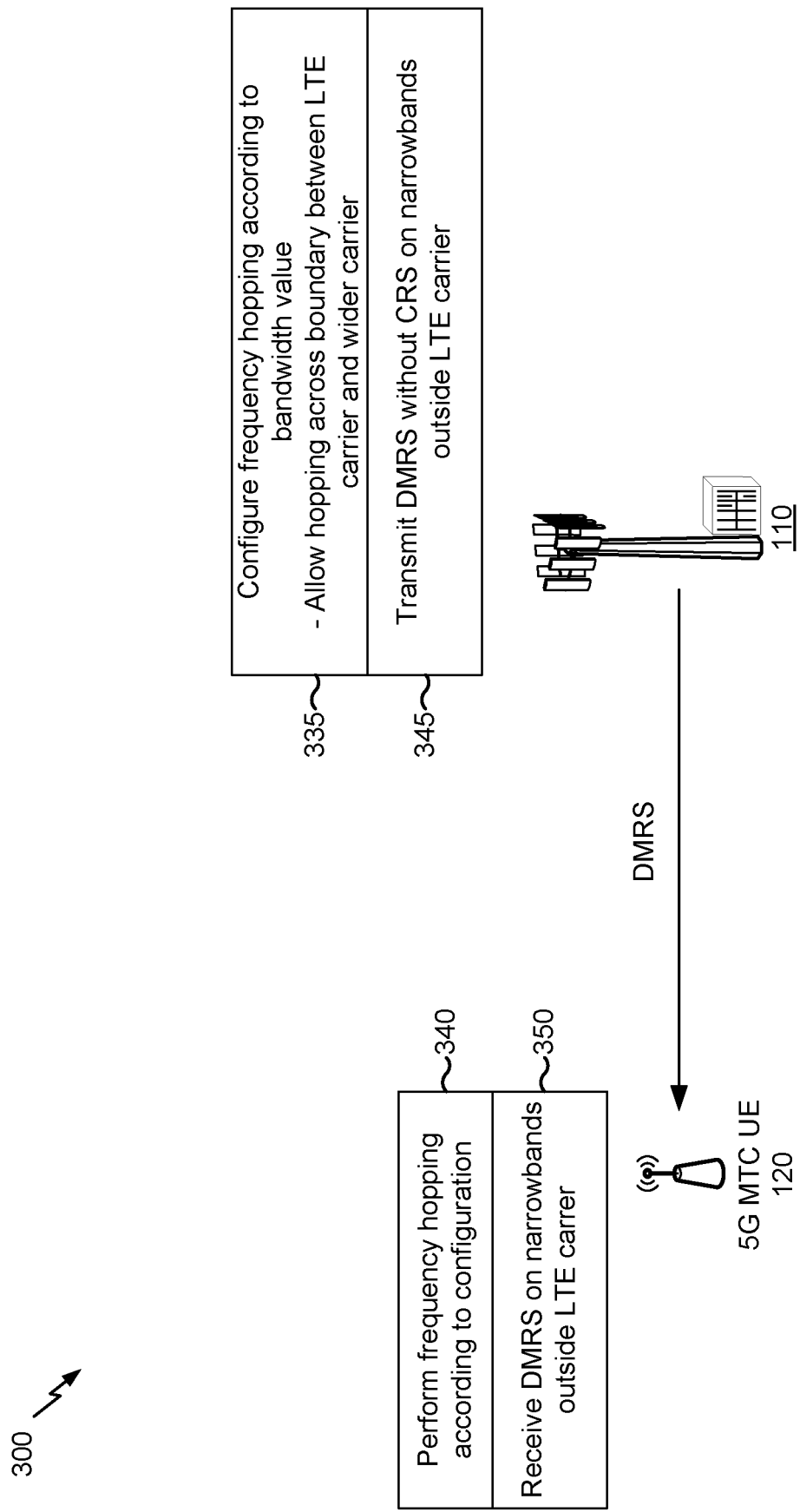

FIGS. 3A and 3B are diagrams illustrating an example 300 of configuration of legacy and 5G MTC UEs to operate in a 5G carrier. As shown, FIGS. 3A and 3B depict a BS 110 and a 5G MTC UE 120. Some of the operations described in FIGS. 3A and 3B are applicable for 5G MTC UEs 120 and LTE MTC UEs 120, whereas other operations described in FIGS. 3A and 3B are applicable only for 5G MTC UEs 120 (e.g., and not LTE MTC UEs 120). A more detailed description of such alternatives is provided below.

As shown in FIG. 3A, and by reference number 305, a BS 110 may transmit a bandwidth value for the 5G MTC UE 120. The bandwidth value may be a first bandwidth value for an LTE MTC UE 120, and may be a second bandwidth value for a 5G MTC UE 120. For example, the first bandwidth value may correspond to a first carrier associated with a first RAT, such as an LTE carrier or bandwidth (e.g., a small bandwidth value). In some aspects, the first bandwidth value may correspond to a small bandwidth of a narrowband, such as 1.4 MHz, 3 MHz, 5 MHz, and/or the like. In this way, a smaller bandwidth is provided for LTE MTC UEs 120 than for 5G MTC UEs 120.

Figure 4:
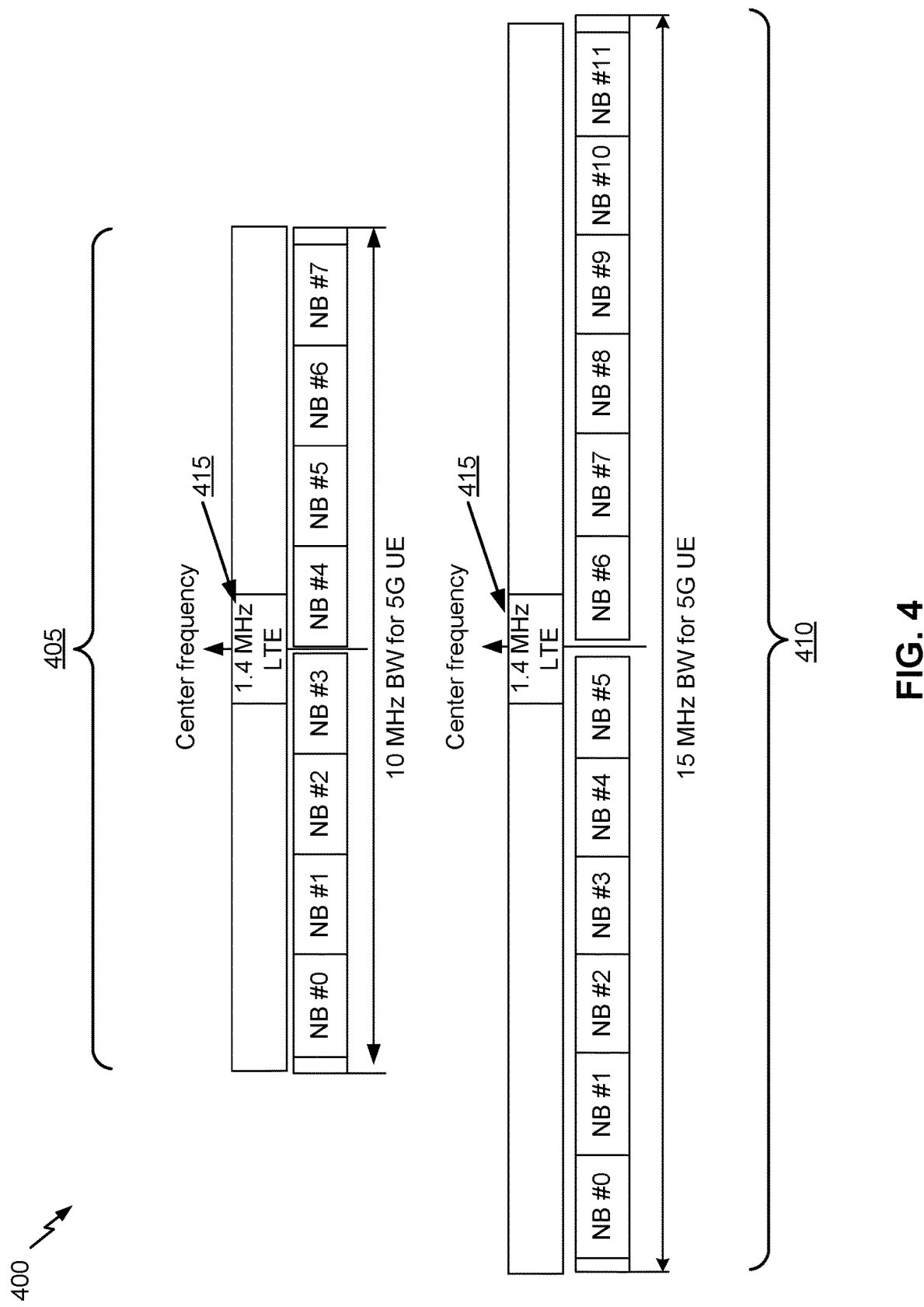
FIG. 4 is a diagram illustrating an example of a narrower bandwidth for an LTE MTC UE and a wider bandwidth for a 5G MTC UE.

In some aspects, the second bandwidth value may correspond to a second carrier with a bandwidth that is wider than the LTE carrier or bandwidth (e.g., with a large number of narrowbands, which may be associated with a second RAT, such as a 5G carrier or band), and/or which may include the LTE carrier or bandwidth. Refer to FIG. 4 for examples of the first carrier (e.g., LTE carrier or bandwidth) and the second carrier. In some aspects, the second bandwidth value may be selected from a set of bandwidths. As just one example, the second bandwidth value may be selected from the set of {5 10 15 20} MHz. In such a case, the signaling for the bandwidth value may include one or more bits that indicate which bandwidth value, of the set, is to be used for the 5G MTC UE 120.

In some aspects, the BS 110 may transmit a bandwidth of the second carrier, and the 5G MTC UE 120 may determine the second bandwidth value based at least in part on a center frequency of the first carrier and the bandwidth. For example, the second carrier may be centered with the first carrier, so the 5G MTC UE 120 may determine the second bandwidth value (and the second carrier) according to the bandwidth and the center frequency. In some aspects, the BS 110 may explicitly signal narrowbands outside of the first carrier to identify the second carrier. For example, the narrowbands outside of the first carrier may not be centered on the first carrier. In such a case, the BS 110 may provide information identifying a starting physical resource block (PRB) index and the length of a number of consecutive PRBs. In some aspects, the PRB numbering may be common between LTE and 5G, independent of the signaled bandwidth of the second carrier. For example, the numbers for both the LTE and 5G carrier may be based at least in part on a 20 MHz LTE system bandwidth that is centered on the first carrier irrespective of whether the bandwidth of the second carrier is 20 MHz. In some aspects, the BS 110 may transmit a bandwidth of the second carrier based at least in part on a 5G signaling approach. For example, the BS 110 may transmit an NR carrier bandwidth, a PRB numbering, and a center frequency, according to the 5G signaling approach. The 5G MTC UE 120 may identify the second carrier based at least in part on the NR carrier bandwidth, the PRB number, and the center frequency.

As shown by reference number 310, the BS 110 may signal the bandwidth value for LTE MTC UEs 120 using a MIB. This may be advantageous because the MIB may occur within the narrower bandwidth (e.g., the LTE carrier or bandwidth). As further shown, the BS 110 may signal the bandwidth value for 5G MTC UEs 120 using a MIB (e.g., within the LTE carrier or bandwidth) or a SIB1-BR. For example, the MIB or the SIB1-BR may include the one or more bits described above to indicate which second bandwidth value is to be used for the 5G MTC UE 120.

As shown by reference number 315, the BS 110 may perform initial access according to the bandwidth value. For example, the UE 120 may perform initial access according to the bandwidth value. Initial access may include transmission/reception of a PSS/SSS/PBCH, a SIB1-BR, and/or other SIBs. In some aspects, the PSS, SSS, and/or PBCH may be transmitted in the first carrier, which may provide access to the PSS, SSS, and/or PBCH for LTE MTC UEs 120 and 5G MTC UEs 120. In some aspects, the PSS, SSS, and/or PBCH may follow a frequency hopping configuration. For example, the frequency hopping may be performed within the first carrier.

In some aspects, the SIB1-BR may be transmitted in the first carrier. For example, the SIB1-BR may follow a frequency hopping configuration that is confined within the first carrier.

In some aspects, the BS 110 may transmit one or more repetitions of the SIB1-BR outside of the first carrier, and the 5G MTC UE 120 may receive the one or more repetitions of the SIB1-BR outside of the first carrier. For example, the BS 110 may transmit the one or more repetitions in the second carrier. In some aspects, the one or more repetitions may be used when the first carrier has a bandwidth of 1.4 MHz or 3 MHz, since only a repetition factor of 4 may be supported for SIB1-BR transmission in such bandwidths.

In some aspects, the one or more repetitions of the SIB1-BR may be signaled using the MIB. For example, the total number of subframes for the additional SIB1-BR transmission may be indicated by 2 bits in the MIB. As an example, a first bit value (e.g., 00) may indicate no additional SIB1-BR; a second bit value (e.g., 01) may indicate the same repetition scheme as that of a legacy (e.g., LTE) SIB1-NB transmission (e.g. 4 subframes per 80 ms SIB1-BR periodicity); a third bit value (e.g., 10) may indicate two times that of the legacy SIB1-NB transmission (e.g. 8 subframes per 80 ms SIB1-BR periodicity); and a fourth bit value (e.g., 11) may indicate four times that of the legacy SIB1-NB transmission (e.g. 16 subframes per 80 ms SIB1-BR periodicity). The above is provided as just one example and other examples are contemplated.

In some aspects, the subframe and radio frame location of the one or more repetitions may be based at least in part on the total number of subframes used for the one or more repetitions. As one example, a particular subframe (e.g., subframe #9) may be used for frequency division duplexing in the case of 4 repetitions outside of the second carrier.

In some aspects, the one or more repetitions of the SIB1-BR may be transmitted on two narrowbands adjacent to the first carrier (e.g., the LTE carrier) that do not overlap with the center 72 subcarriers. If the additional bandwidth for the second carrier is not signaled in the MIB, then the frequency location of the two narrowbands (e.g., expressed as an offset from a center frequency) may be indicated in the MIB (e.g., using a 1-bit indicator in the MIB). The 1-bit indicator in the MIB may indicate one of two sets of bandwidths. For example, the 1-bit indicator may indicate whether a first set (e.g., {10 20} MHz) or a second set (e.g., {5 15} MHz) is to be used to determine the frequency locations of the two narrowbands.

In some aspects, the BS 110 may transmit one or more SIBs other than SIB1-BR. For example, an LTE MTC UE 120 or a 5G MTC UE 120 may receive the other SIB. As an example, the BS 110 may transmit at least legacy transmissions of essential SIBs in the first carrier. In some aspects, the BS 110 may schedule one or more repetitions of a SIB outside of the first carrier (e.g., in the second carrier), which may reduce the acquisition time for 5G MTC UEs. When the BS 110 schedules the one or more repetitions, the BS 110 may signal the one or more repetitions in SIB1 (e.g., SIB1-BR).

As shown by reference number 320, the 5G MTC UE 120 may monitor paging on one or more narrowbands outside of an LTE carrier. For example, the one or more narrowbands may be included in the second carrier and not the first carrier. In some aspects, the 5G MTC UE 120 may monitor paging in the one or more narrowbands outside of the LTE carrier, or may monitor paging within the LTE carrier, based at least in part on information associated with the 5G MTC UE 120, such as a UE identifier. In some aspects, an LTE MTC UE 120 may monitor paging in the first carrier. For example, the BS 110 may transmit a control channel (e.g., an MTC physical downlink control channel (MPDCCH)) for paging in the first carrier for the LTE MTC UE 120.

As shown by reference number 325, the 5G MTC UE 120 (and the BS 110) may perform random access on one or more narrowbands outside of an LTE carrier according to the bandwidth value. For example, the BS 110 may signal one or more narrowbands (e.g., uplink and/or downlink narrowbands) to use for random access of the 5G MTC UE 120. In some aspects, the one or more narrowbands may be within the first carrier or may be outside of the first carrier and within the second carrier. In some aspects, the LTE MTC UE 120 and the 5G MTC UE 120 may use a legacy approach for random access. For example, the LTE MTC UE 120 and the 5G MTC UE 120 may perform random access using the first carrier.

Figure 5:
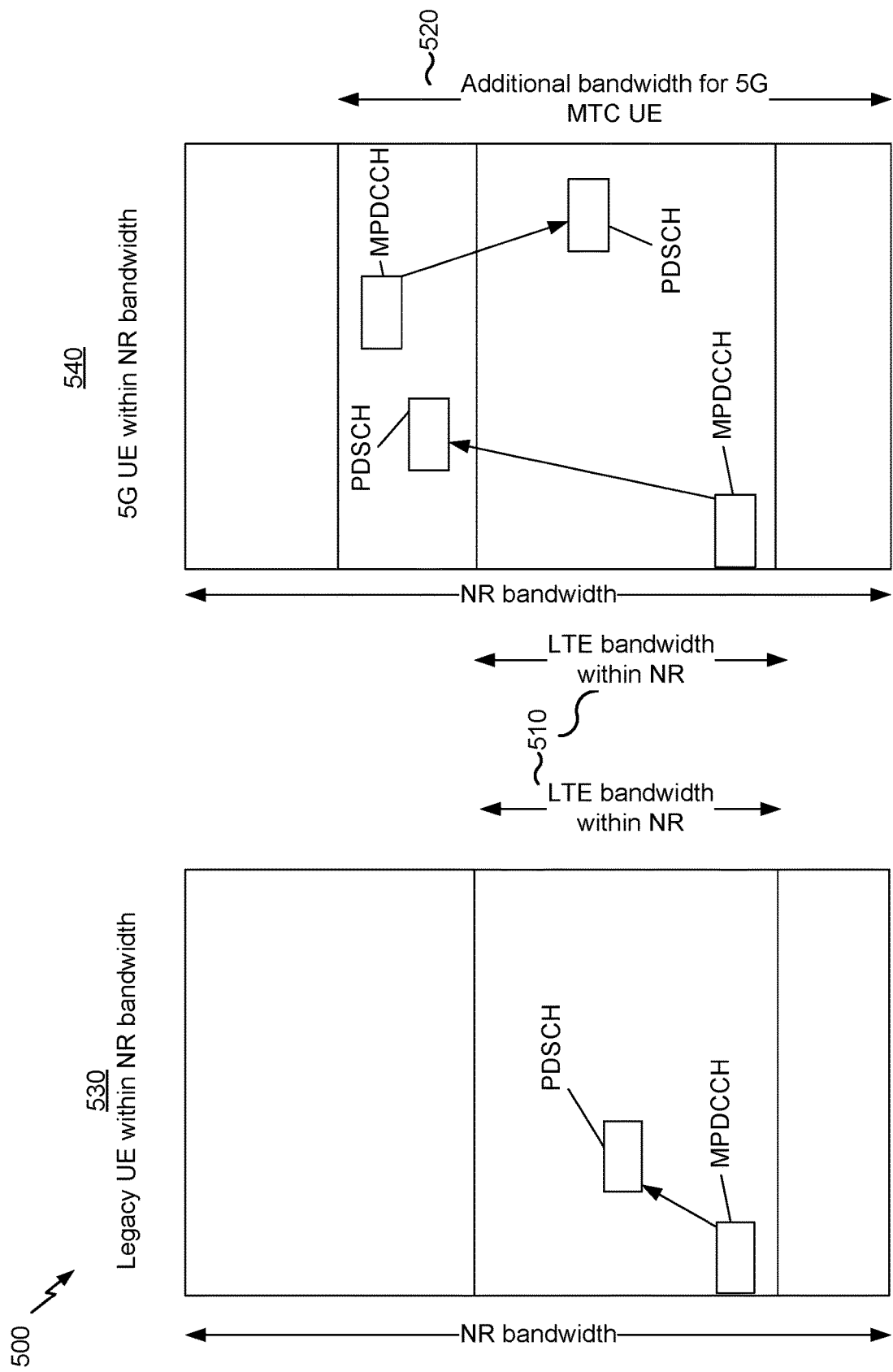
FIG. 5 is a diagram illustrating an example of scheduling and data communication for LTE MTC UEs and 5G MTC UEs.

As shown by reference number 330, the 5G MTC UE 120 may receive unicast signaling on the LTE carrier (e.g., the first carrier) or the wider carrier (e.g., the second carrier; the 5G carrier with a bandwidth outside of the LTE carrier) according to downlink control information (DCI). For example, unicast signaling may include a unicast MPDCCH that carries DCI to schedule resources for a unicast physical downlink shared channel (PDSCH). In some aspects, the 5G MTC UE 120 may receive the unicast MPDCCH outside of the first carrier and within the second carrier. In some aspects, the 5G MTC UE 120 may receive the unicast PDSCH on a narrowband that is within the first carrier, or that is outside of the first carrier and within the second carrier. In some aspects, the MPDCCH and the PDSCH may be on different carriers. For example, one may be received or transmitted on the first carrier and one may be received or transmitted on the second carrier. Refer to FIG. 5 for an example of unicast scheduling with regard to the first carrier and the second carrier.

As shown in FIG. 3B, and by reference number 335, the BS 110 may configure frequency hopping for the 5G MTC UE 120 according to the bandwidth value. As shown by reference number 340, the 5G MTC UE 120 may perform frequency hopping according to the configuration and/or the bandwidth value. In a first approach, the BS 110 may configure the frequency hopping based at least in part on a first narrowband index of the frequency hopping sequence. For example, if the first narrowband index is in the first carrier, then the BS 110 (and the 5G MTC UE 120) may follow the legacy frequency hopping approach to perform hopping within the first carrier. If the first narrowband index is outside of the first carrier and in the second carrier, the BS 110 (and the 5G MTC UE 120) may perform frequency hopping outside of the first carrier and within the second carrier. In a second approach, the BS 110 (and the 5G MTC UE 120) may perform frequency hopping within the first carrier and the second carrier. For example, the BS 110 may hop from a first narrowband within the first carrier to a second narrowband outside of the first carrier. In some aspects, an LTE MTC UE 120 may perform frequency hopping according to a legacy behavior within the first carrier.

Figure 6:
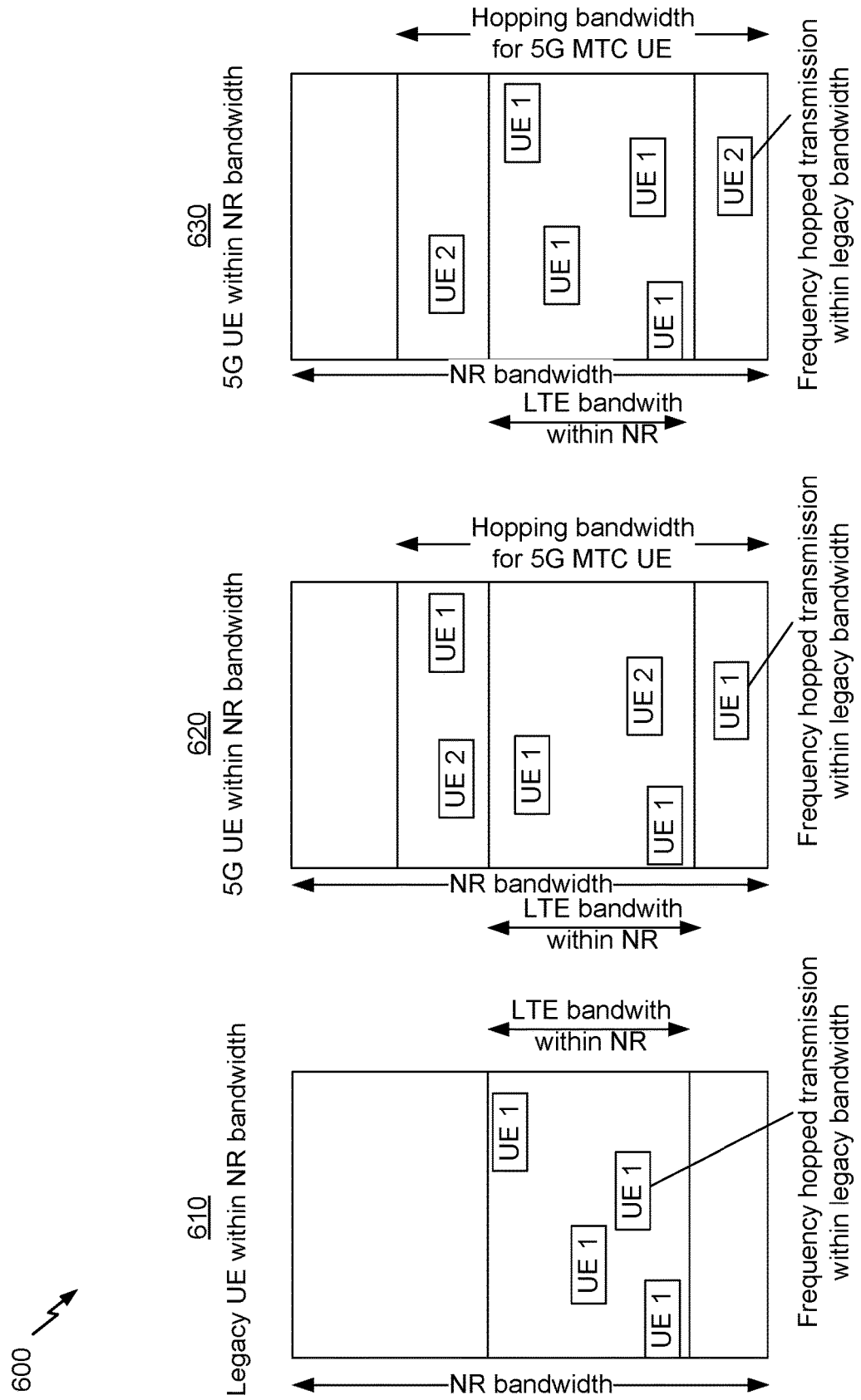
FIG. 6 is a diagram illustrating an example of frequency hopping for LTE MTC UEs and 5G MTC UEs.

In some aspects, frequency hopping may be configured independently for the first carrier and the second carrier. For example, frequency hopping may be permitted outside of the first carrier and within the second carrier, and may not be permitted within the first carrier. In a case wherein frequency hopping is permitted within the first carrier and the second carrier, then a number of narrowbands over which the MPDCCH/PDSCH hops, and/or the narrowband offset between one narrowband and the next narrowband, may be different for the first carrier and the second carrier. Refer to FIG. 6 for examples of frequency hopping approaches for the first carrier and the second carrier.

As shown by reference number 345, the BS 110 may transmit a demodulation reference signal (DMRS) for a PDSCH transmission on one or more narrowbands that are outside of the LTE carrier. As shown by reference number 350, the 5G MTC UE 120 may receive the DMRS on the one or more narrowbands that are outside of the LTE carrier. For example, the BS 110 may transmit the DMRS without a CRS outside of the first carrier and within the second carrier. For example, the BS 110 may transmit the DMRS within a particular temporal range of a transmission (e.g., a set of subframes before and a set of subframes after the associated PDSCH transmission) for the 5G MTC UE 120, or within a particular frequency range of a narrowband of the second carrier (e.g., within the 6 PRBs+/−1 PRB), based at least in part on identifying one or more narrowbands outside of a bandwidth of the first carrier. In some aspects, the BS 110 may transmit the CRS outside of the first carrier and within the second carrier. For example, the BS 110 may transmit the CRS within a particular temporal range of a transmission (e.g., a set of subframes before and a few subframes after the associated PDSCH transmission) for the 5G MTC UE 120, or within a particular frequency range of a narrowband of the second carrier (e.g., within the 6 PRBs+/−1 PRB), based at least in part on identifying one or more narrowbands outside of a bandwidth of the first carrier. In this way, the BS 110 may provide a CRS for a PDSCH transmission to a 5G MTC UE 120 that operates outside of the bandwidth of the first carrier and within the bandwidth of the second carrier. In some aspects, the BS 110 may transmit the CRS within the first bandwidth for the LTE MTC UE 120.

In some aspects, the BS 110 may transmit a CRS outside of the first carrier. For example, the BS 110 may transmit a CRS in a narrowband outside of the first carrier and within the second carrier to enable channel state information (CSI) feedback for the 5G MTC UE 120. In some aspects, the BS 110 may transmit the CRS outside of the first carrier intermittently or periodically. In some aspects, the BS 110 may transmit the CRS outside of the first carrier with a reduced density on both frequency domain and time domain. In some aspects, the 5G MTC UE 120 may perform radio resource management (RRM) measurement in the first carrier using a CRS that is transmitted within the first carrier.

As indicated above, FIGS. 3A and 3B are provided as examples. Other examples may differ from what is described with respect to FIGS. 3A and 3B.

FIG. 4 is a diagram illustrating examples 400 of carrier bandwidths for a first carrier, associated with an LTE MTC UE, and a second carrier associated with a 5G MTC UE. Reference number 405 shows an example wherein the second carrier has a bandwidth value of 10 MHz, and reference number 410 shows an example wherein the second carrier has a bandwidth value of 15 MHz. As shown by reference numbers 415, the first carrier in FIG. 4 is associated with a bandwidth value of 1.4 MHz. Furthermore, the second carrier in each case is centered on the corresponding first carrier. As further shown, each second carrier includes multiple, different narrowbands. For example, the second carrier shown by reference number 405 includes 8 narrowbands, and the second carrier shown by reference number 410 includes 12 narrowbands.

In some aspects, the valid subframe configuration for the first carrier may be different than the valid subframe configuration for the second carrier. For example, the BS 110 may configure the valid subframe configuration for the first carrier and/or the second carrier, and/or may transmit information identifying the valid subframe configurations of the first carrier and/or the second carrier. In some aspects, the valid subframe configuration for the first carrier may have a temporal granularity of 1 ms, and the valid subframe configuration for the second carrier may have a temporal granularity of less than 1 ms. In some aspects, the valid subframe configuration for the second carrier may have a temporal granularity of 0.5 ms, 0.25 ms, or 0.125 ms. In some aspects, the physical downlink shared channel or physical uplink shared channel may be configured with 2 or more sets of valid subframe configurations and be indicated which set is to use for a particular transmission via 1 or more bits in MPDCCH. In some aspects, the valid subframe configuration for the second carrier may include also a valid symbol configuration. In some aspects, the BS 110 may configure the valid symbol configuration for the second carrier to handle coexistence with 5G. In some aspects, a control region of the first carrier may be different than a control region of the second carrier. For example, the first carrier may have a control region of a first size (e.g., 3 symbols) and the second carrier may have a control region of a second size (e.g., 2 symbols).

As indicated above, FIG. 4 is provided as an example. Other examples may differ from what is described with respect to FIG. 4.

FIG. 5 is a diagram illustrating an example 500 of scheduling and data communication for LTE MTC UEs and 5G MTC UEs. In FIG. 5, the first carrier is denoted by reference number 510 (and shown as "LTE bandwidth within NR"). The second carrier is denoted by reference number 520 (and shown as "Additional bandwidth for 5G MTC UE"). As shown by reference number 530, a MPDCCH and PDSCH for a legacy UE (e.g., an LTE MTC UE) within the NR bandwidth may be provided in the first carrier. As shown by reference number 540, in some aspects, an MPDCCH and/or a PDSCH for a 5G MTC UE may be provided in the first carrier and/or in the second carrier. In other words, the control channel and data channel for the 5G MTC UE may be provided in different carriers, of the first carrier and the second carrier.

As indicated above, FIG. 5 is provided as an example. Other examples may differ from what is described with respect to FIG. 5.

FIG. 6 is a diagram illustrating an example 600 of frequency hopping for LTE MTC UEs and 5G MTC UEs. As shown in FIG. 6, and by reference number 610, in some aspects, frequency hopping for an LTE MTC UE may be confined to the first carrier (e.g., the LTE bandwidth or the first carrier). As shown by reference number 620, in some aspects, frequency hopping for a 5G MTC UE may not be confined to the first carrier or the second carrier. For example, some frequency hops may occur within the first carrier (e.g., a first two frequency hops of UE1) and other frequency hops may occur outside of the first carrier (e.g., a last two frequency hops of UE1). As shown by reference number 630, in some aspects, frequency hopping for a 5G MTC UE may be confined to the carrier in which a first frequency hop occurred. For example, the frequency hops of UE1 shown in connection with reference number 630 are confined to the first carrier, and the frequency hops of UE2 shown in connection with reference number 630 are confined to the second carrier and outside of the first carrier.

As indicated above, FIG. 6 is provided as an example. Other examples may differ from what is described with respect to FIG. 6.

Figure 7:
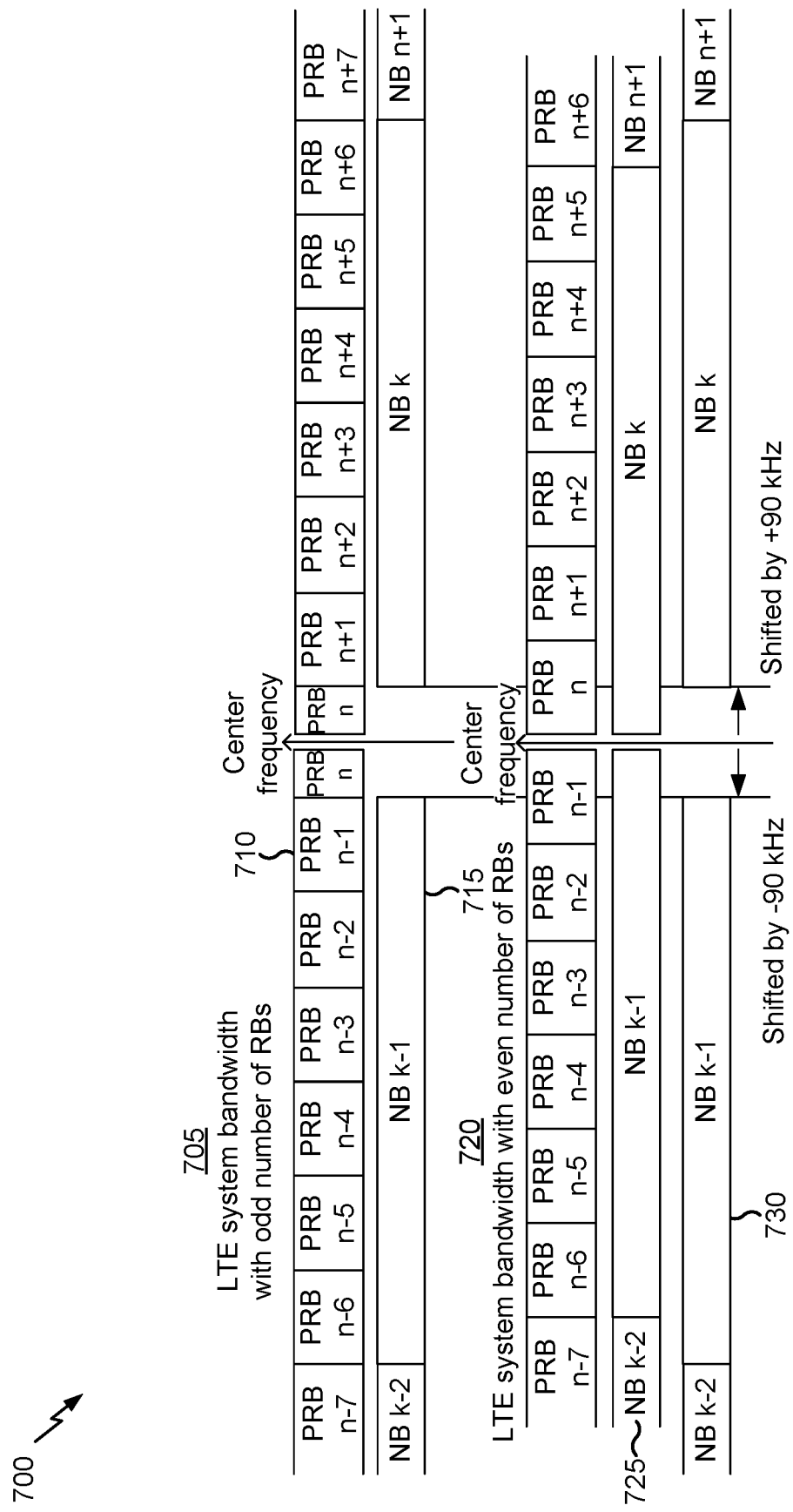
FIG. 7 is a diagram illustrating an example of a narrowband frequency offset or shift for LTE MTC UEs and 5G MTC UEs.

FIG. 7 is a diagram illustrating an example 700 of a PRB shift for aligning narrowbands for LTE MTC UEs and 5G MTC UEs. For some bandwidths, the resource blocks and narrowband of the first carrier and the second carrier may not be aligned with each other due to the extra odd physical resource block. As an example, refer to the LTE system bandwidth with an odd number of RBs shown by reference number 705. This may be, for example, a 3 MHz system bandwidth. The RBs for this system bandwidth are shown by reference number 710, and the narrowbands associated with this system bandwidth are shown by reference number 715. Now refer to the LTE system bandwidth with an even number of RBs shown by reference number 720. The default narrowband configuration for this LTE system bandwidth is shown by reference number 725. Notice that NB k−2 of the narrowbands shown by reference number 725 partially overlaps with NB k−1 of the narrowbands shown by reference number 715. This may be an issue when the lower set of narrowbands (shown by reference number 725) is used for the second carrier, since there may be misalignment between the narrowbands in the first carrier (shown by reference number 715) and the second carrier (shown by reference number 725).

This narrowband misalignment may cause potential collision between a legacy LTE MTC UE and a 5G MTC UE when the 5G MTC UE is allocated with a narrowband outside of the first carrier. For example, assume a 3 MHz carrier bandwidth for the LTE MTC UE and a 10 MHz carrier bandwidth for the 5G MTC UE. In such a case, the narrowband #0 in the 3 MHz carrier (not shown) may partially overlap narrowbands #2 and #3 of the 10 MHz carrier (not shown). In such a case, only the narrowbands not overlapping with the first carrier bandwidth can be configured for the 5G MTC UE, resulting in inefficient resource utilization.

Some techniques and apparatuses described herein may align the NBs between the first carrier and the second carrier by shifting narrowbands in the second carrier based at least in part on a predefined value or shift, which may be a function of the two carrier bandwidths and the narrowband location. For example, a shift of +/−90 kHz or half an RB may be applied when a 3 MHz or 5 MHz carrier bandwidth is configured for the legacy LTE MTC UE, and when a 10 MHz or 20 MHz carrier bandwidth is configured for the 5G MTC UE. In this case, and in the cases described in the next paragraph, the positive aspect of the shift (e.g., +90 kHz) may be used for the upper NBs above the center frequency (e.g., with an NB index between $(N_{RB}/6)/2$ and $(N_{RB}/6)−1$), and the negative aspect of the shift (e.g., −90 kHz) may be used for the lower NBs below the center frequency (e.g., with an NB index less than $(N_{RB}/6)/2$)). This shift is shown by reference number 730. As can be seen, NB k−1 shown by reference number 730 correctly aligns with NB k−1 shown by reference number 715. Thus, collision of NBs between different carriers is reduced or eliminated.

In some aspects, the value of the narrowband shift may be a function of the bandwidth and the narrowband index. For example, if a 1.4 MHz bandwidth is used for the first carrier and a 5 MHz or 15 MHz bandwidth is used for the second carrier, the narrowbands in the second carrier may be shifted by +/−3 RBs. If a 1.4 MHz bandwidth is used for the first carrier and a 10 MHz or 20 MHz bandwidth is used for the second carrier, the narrowbands in the second carrier may be shifted by +/−3.5 RBs. As another example, if a 3 MHz or 5 MHz bandwidth is used for the first carrier and a 5 MHz or 15 MHz bandwidth is used for the second carrier, no shift may be applied. If a 3 MHz or 5 MHz bandwidth is used for the first carrier and a 10 MHz or 20 MHz bandwidth is used for the second carrier, the narrowbands in the second carrier may be shifted by +/−0.5 RBs.

As indicated above, FIG. 7 is provided as an example. Other examples may differ from what is described with respect to FIG. 7.

Figure 8:
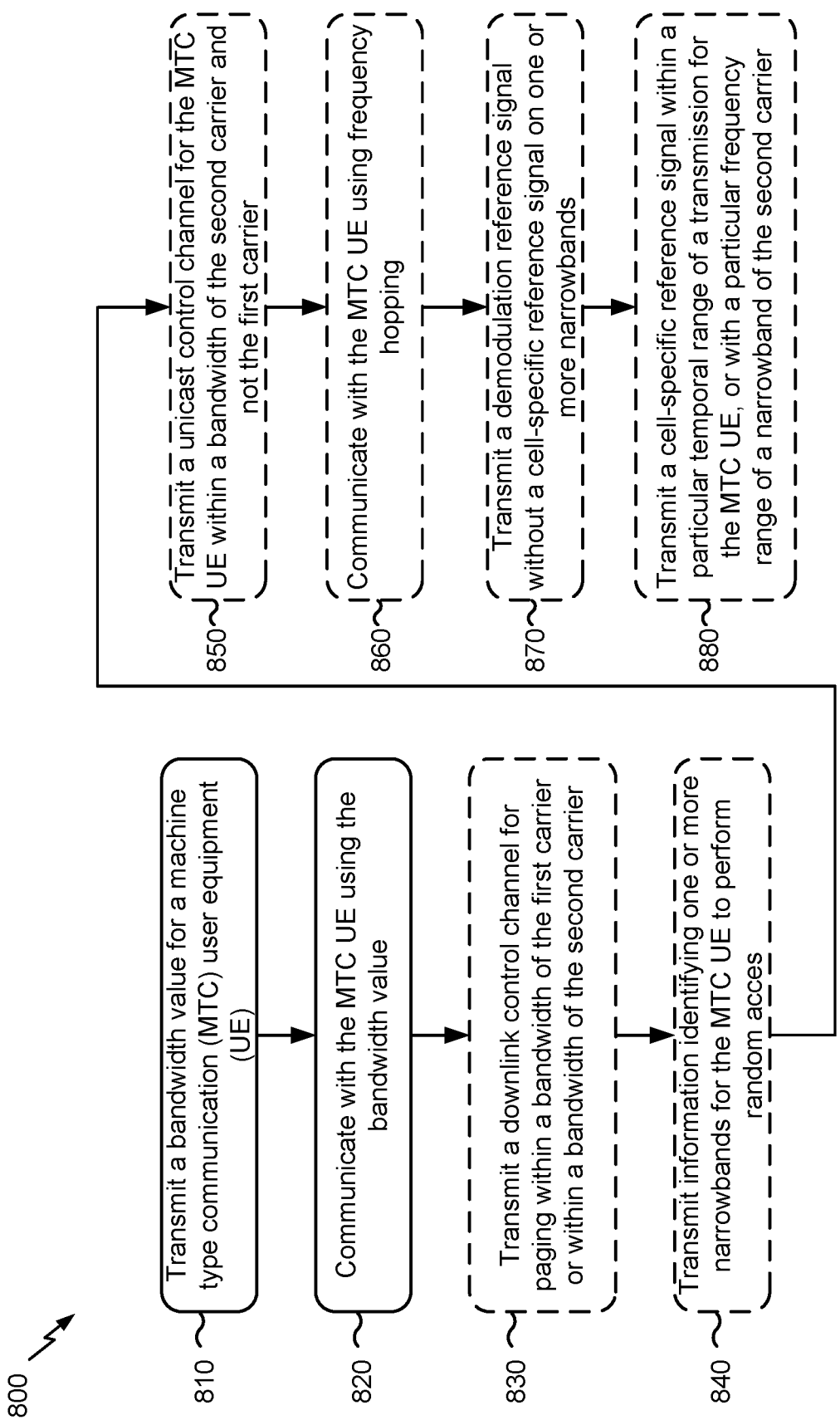
FIG. 8 is a flow chart of a method of wireless communication.

FIG. 8 is a flow chart of a method 800 of wireless communication. The method may be performed by a base station (e.g., the BS 110 of FIG. 1, apparatus 902/902', and/or the like). Optional steps of the method 800 are indicated by dashed flowchart blocks in FIG. 8.

At 810, the base station (e.g., using controller/processor 240, transmit processor 220, TX MIMO processor 230, MOD 232, antenna 234, and/or the like) may transmit a bandwidth value for a machine type communication (MTC) user equipment (UE). For example, the bandwidth value may be a first bandwidth value when the MTC UE is configured to use a first carrier associated with a first radio access technology (e.g., LTE). The bandwidth value may be a second bandwidth value when the MTC UE is configured to use a second carrier associated with a second radio access technology (e.g., 5G). In some aspects, the first bandwidth value is signaled using a master information block contained within the first carrier. In some aspects, the second bandwidth value is signaled using a master information block contained within the first carrier or a system information block associated with MTC. In some aspects, the base station may signal information identifying one or more repetitions of a system information block associated with MTC, wherein the one or more repetitions are transmitted outside of a bandwidth of the first carrier and within a bandwidth of the second carrier, and wherein the information identifying the one or more repetitions is signaled using a master information block contained within the first carrier. In some aspects, the one or more repetitions are transmitted in one or more narrowbands adjacent to the first carrier.

At 820, the base station (e.g., using controller/processor 240, transmit processor 220, TX MIMO processor 230, MOD 232, antenna 234, and/or the like) may communicate with the MTC UE using the bandwidth value. For example, the base station may transmit certain signals within the first carrier when the MTC UE is an LTE MTC UE. In some aspects, the base station may transmit certain signals within the first carrier and/or the second carrier when the MTC UE is a 5G MTC UE. In some aspects, a valid subframe configuration for a narrowband outside of the bandwidth of the first carrier has a temporal granularity of less than 1 millisecond. In some aspects, a control region of the first carrier is of a different size than a control region for the second carrier. In some aspects, narrowbands in the first carrier and narrowbands in the second carrier are aligned with each other based at least in part on a shift that is applied to the narrowbands in the second carrier. In some aspects, the shift is based at least in part on a bandwidth of the first carrier and a bandwidth of the second carrier. In some aspects, the first carrier and the second carrier are centered on the same frequency, and a bandwidth of the first carrier is contained within a bandwidth of the second carrier.

At 830, the base station (e.g., using controller/processor 240, transmit processor 220, TX MIMO processor 230, MOD 232, antenna 234, and/or the like) may transmit a downlink control channel for paging within a bandwidth of the first carrier or within a bandwidth of the second carrier. For example, in some cases, the base station may transmit the downlink control channel for paging in the bandwidth of the first carrier. In other cases, the base station may transmit the downlink control channel for paging in the bandwidth of the second carrier and not the first carrier. This may be based at least in part on a UE identifier of the MTC UE (e.g., the 5G MTC UE) and a capability of the MTC UE to use the second carrier for MTC communication.

At 840, the base station (e.g., using controller/processor 240, transmit processor 220, TX MIMO processor 230, MOD 232, antenna 234, and/or the like) may signal information identifying one or more narrowbands for the MTC UE to perform random access. For example, the one or more narrowbands may be within a bandwidth of the second carrier and not the first carrier. In such a case, the MTC UE may be a 5G MTC UE.

At 850, the base station (e.g., using controller/processor 240, transmit processor 220, TX MIMO processor 230, MOD 232, antenna 234, and/or the like) may transmit a unicast control channel for the MTC UE within a bandwidth of the second carrier and not the first carrier. For example, the unicast control channel may be transmitted within the bandwidth of the second carrier and not the first carrier based at least in part on the MTC UE being configured to use the second carrier (e.g., based at least in part on the MTC UE being a 5G MTC UE). In such a case, the base station may transmit, based at least in part on the unicast control channel, a unicast shared channel corresponding to the unicast control channel in the same carrier as the unicast control channel, within a bandwidth of the first carrier or within the bandwidth of the second carrier.

At 860, the base station (e.g., using controller/processor 240, transmit processor 220, TX MIMO processor 230, MOD 232, antenna 234, and/or the like) may communicate with the MTC UE using frequency hopping in accordance with the bandwidth value. In some aspects, when a first frequency hop is contained within a bandwidth of the first carrier, all frequency hops for the MTC UE are contained within the bandwidth of the first carrier. In some aspects, when a first frequency hop is outside of the bandwidth of the first carrier, all frequency hops for the MTC UE are outside of the bandwidth of the first carrier. In some aspects, one or more frequency hops are within a bandwidth of the first carrier and one or more frequency hops are outside of the bandwidth of the first carrier. In some aspects, at least one of a number of narrowbands for the frequency hopping or an offset between the narrowbands for the frequency hopping is different for the first carrier than for the second carrier.

At 870, the base station (e.g., using controller/processor 240, transmit processor 220, TX MIMO processor 230, MOD 232, antenna 234, and/or the like) may transmit a demodulation reference signal without a cell-specific reference signal on one or more narrowbands. For example, the one or more narrowbands may be outside of a bandwidth of the first carrier. In this case, in some aspects, the base station may only transmit the CRS within the bandwidth of the first carrier.

At 880, the base station (e.g., using controller/processor 240, transmit processor 220, TX MIMO processor 230, MOD 232, antenna 234, and/or the like) may transmit a cell-specific reference signal within a particular temporal range of a transmission for the MTC UE, or within a particular frequency range of a narrowband of the second carrier. For example, when the base station identifies one or more narrowbands outside of a bandwidth of the first carrier, the base station may transmit a cell-specific reference signal within a particular temporal range of a transmission for the MTC UE, or within a particular frequency range of the one or more narrowbands in the second carrier.

In some aspects, the base station (e.g., using controller/processor 240, transmit processor 220, TX MIMO processor 230, MOD 232, antenna 234, and/or the like) may signal information identifying one or more narrowbands outside of a bandwidth of the first carrier. For example, the information may identify at least a first PRB and a number of contiguous PRBs of the one or more narrowbands. The one or more narrowbands may form the second carrier.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
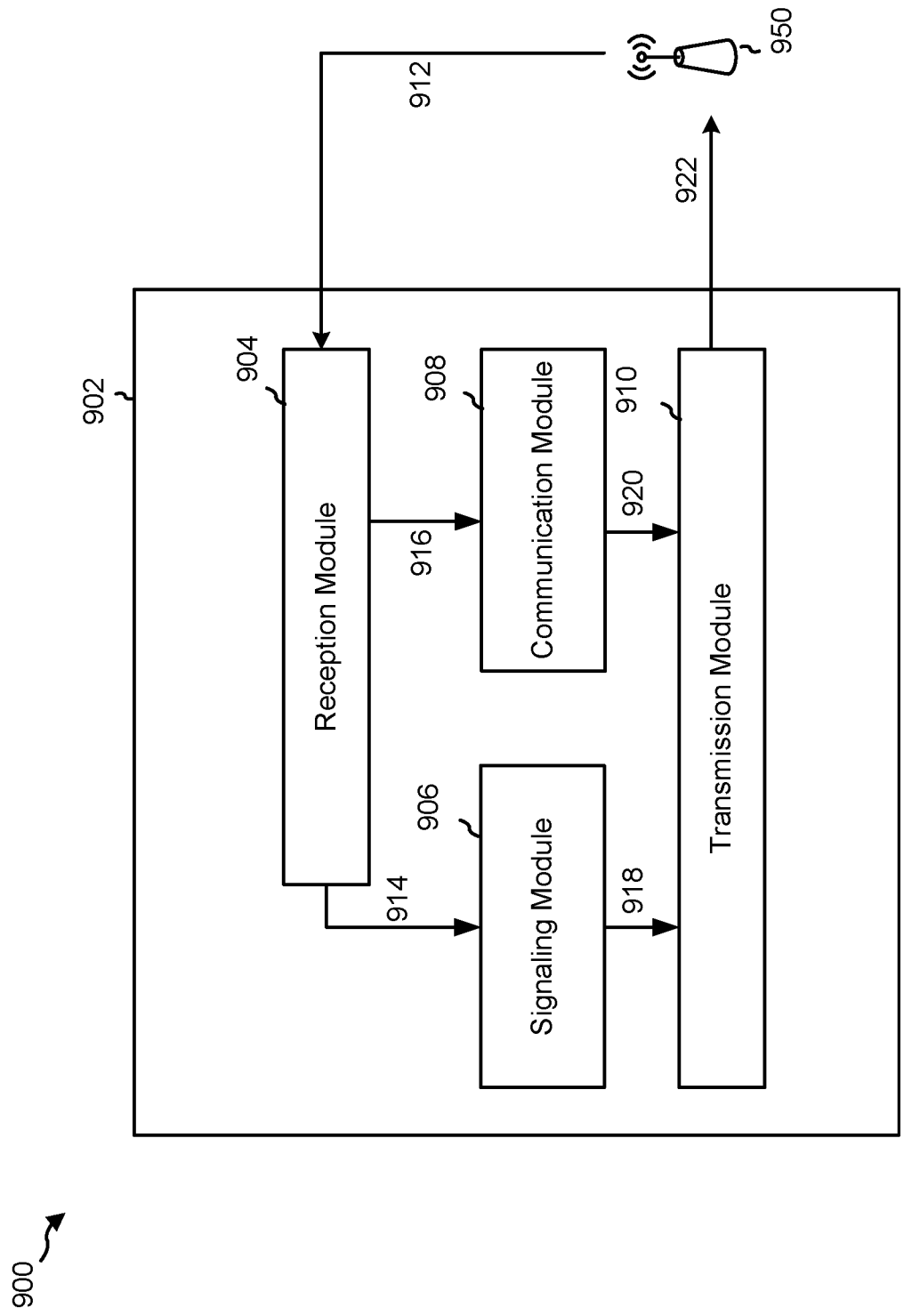
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be an eNB or a gNB such as a base station (e.g., BS 110). In some aspects, the apparatus 902 includes a reception module 904, a signaling module 906, a communication module 908, and/or a transmission module 910.

The reception module 904 may receive signals 912 from a wireless communication device 950 (e.g., an MTC UE 120). The reception module 904 may provide data 914 and/or data 916 to the signaling module 906 and/or the communication module 908.

The signaling module 906 may signal or transmit a bandwidth value for an MTC UE, such as wireless communication device 950, by providing data 918 to the transmission module 910 for transmission as signals 922 to the wireless communication device 950. Additionally, or alternatively, the signaling module 906 may signal information identifying one or more narrowbands for the MTC UE to perform random access, or may signal information identifying one or more narrowbands outside of a bandwidth of the first carrier, similarly.

The communication module 908 may communicate with the wireless communication device 950 (e.g., using the reception module 904 and/or the transmission module 910). For example, the communication module 908 may provide data 920 to the transmission module 910 for transmission as signals 922 to the wireless communication device 950. In some aspects, the communication module 908 may communicate with the wireless communication device 950 using frequency hopping in accordance with the bandwidth value.

The transmission module 910 may transmit signals 922 to the wireless communication device 950 based at least in part on the data 918/920. For example, the transmission module 910 may transmit transmitting a downlink control channel for paging within a bandwidth of the first carrier or within a bandwidth of the second carrier and not the first carrier based at least in part on a UE identifier of the wireless communication device 950; may transmit a unicast control channel for the wireless communication device 950 within a bandwidth of the second carrier and not the first carrier; may transmit a demodulation reference signal without a cell-specific reference signal on one or more narrowbands outside of a bandwidth of the first carrier; may transmit transmitting a cell-specific reference signal within a particular temporal range of a transmission for the MTC UE, or with a particular frequency range of a narrowband of the second carrier; and/or the like.

The apparatus may include additional modules that perform each of the blocks of the algorithm in the aforementioned method 800 of FIG. 8, and/or the like. As such, each block in the aforementioned method 800 of FIG. 8 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
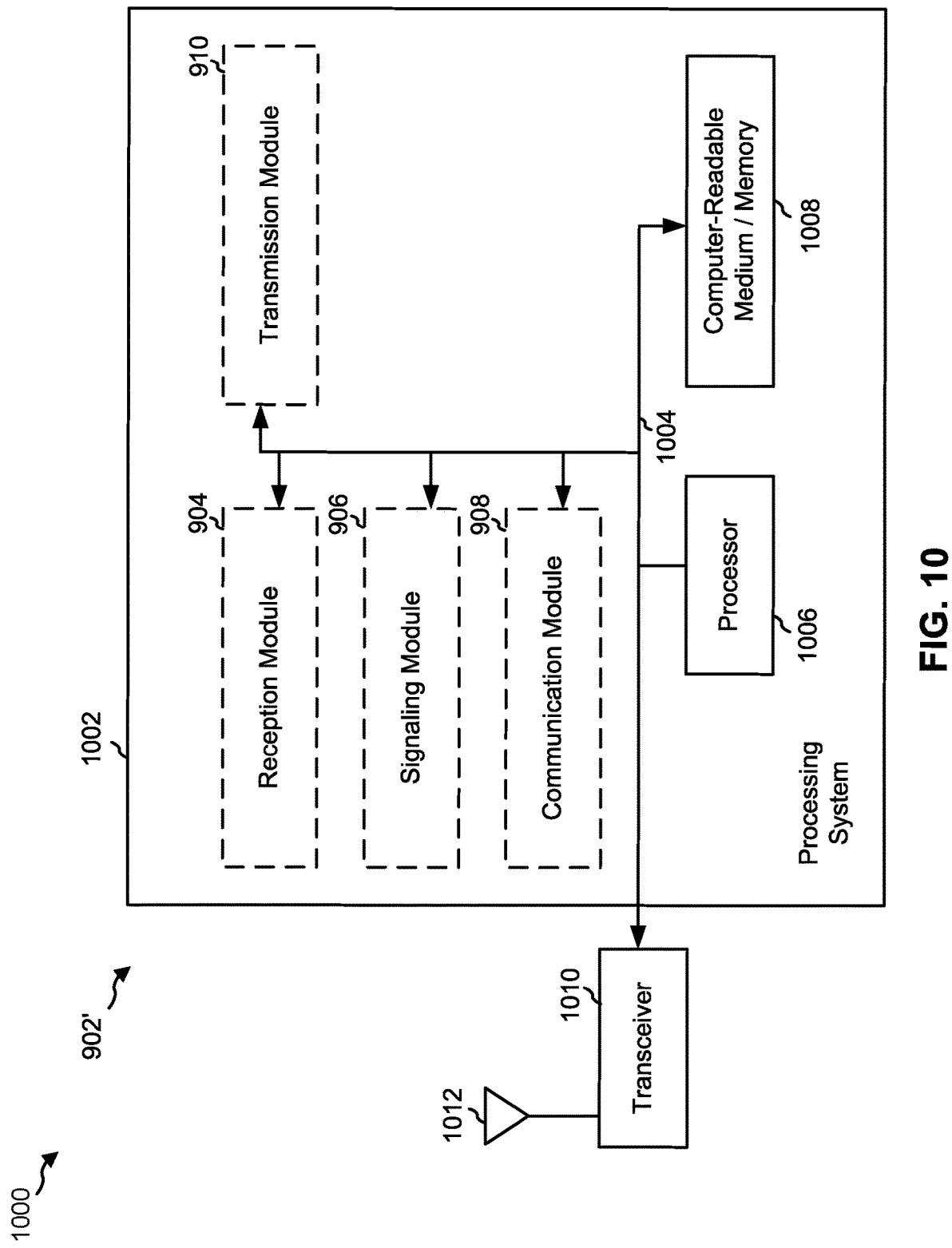
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be an eNB or a gNB such as a base station (e.g., BS 110).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904, 906, 908, 910. The modules may be software modules running in the processor 1006, resident/stored in the computer readable medium/memory 1008, one or more hardware modules coupled to the processor 1006, or some combination thereof. The processing system 1002 may be a component of the BS 110 and may include the memory 242 and/or at least one of the TX MIMO processor 230, the RX processor 238, and/or the controller/processor 240.

In some aspects, the apparatus 902/902' for wireless communication includes means for transmitting a bandwidth value for an MTC UE, wherein the bandwidth value is a first bandwidth value when the MTC UE is configured to use a first carrier associated with a first radio access technology and wherein the bandwidth value is a second bandwidth value when the MTC UE is configured to use a second carrier associated with a second radio access technology; means for communicating with the MTC UE using the bandwidth value; means for transmitting a downlink control channel for paging within a bandwidth of the first carrier or within a bandwidth of the second carrier and not the first carrier based at least in part on a UE identifier of the MTC UE and a capability of the MTC UE to use the second carrier for MTC communication; means for transmitting information identifying one or more narrowbands for the MTC UE to perform random access, wherein the one or more narrowbands are within a bandwidth of the second carrier and not the first carrier means for transmitting a unicast control channel for the MTC UE within a bandwidth of the second carrier and not the first carrier, wherein the unicast control channel is transmitted within the bandwidth of the second carrier and not the first carrier based at least in part on the MTC UE being configured to use the second carrier; means for communicating with the MTC UE using frequency hopping, wherein, when a first frequency hop is contained within a bandwidth of the first carrier, all frequency hops for the MTC UE are contained within the bandwidth of the first carrier, and when a first frequency hop is outside of the bandwidth of the first carrier, all frequency hops for the MTC UE are outside of the bandwidth of the first carrier; means for communicating with the MTC UE using frequency hopping, wherein one or more frequency hops are within a bandwidth of the first carrier and one or more frequency hops are outside of the bandwidth of the first carrier; means for communicating with the MTC UE using frequency hopping, wherein at least one of a number of narrowbands for the frequency hopping or an offset between the narrowbands for the frequency hopping is different for the first carrier than for the second carrier; means for transmitting a demodulation reference signal without a cell-specific reference signal on one or more narrowbands outside of a bandwidth of the first carrier; means for transmitting a cell-specific reference signal within a particular temporal range of a transmission for the MTC UE, or with a particular frequency range of a narrowband of the second carrier, based at least in part on identifying one or more narrowbands outside of a bandwidth of the first carrier; means for transmitting information identifying one or more repetitions of a system information block associated with MTC, wherein the one or more repetitions are transmitted outside of a bandwidth of the first carrier and within a bandwidth of the second carrier, and wherein the information identifying the one or more repetitions is signaled using a master information block contained within the first carrier; and means for transmitting information identifying one or more narrowbands outside of a bandwidth of the first carrier, wherein the information indicates at least a first PRB and a number of continuous PRBs. The aforementioned means may be one or more of the aforementioned modules of the apparatus 902 and/or the processing system 1002 of the apparatus 902' configured to perform the functions recited by the aforementioned means. As described supra, the processing system 1002 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 10 is provided as an example. Other examples may differ from what is described in connection with FIG. 10.

Figure 11:
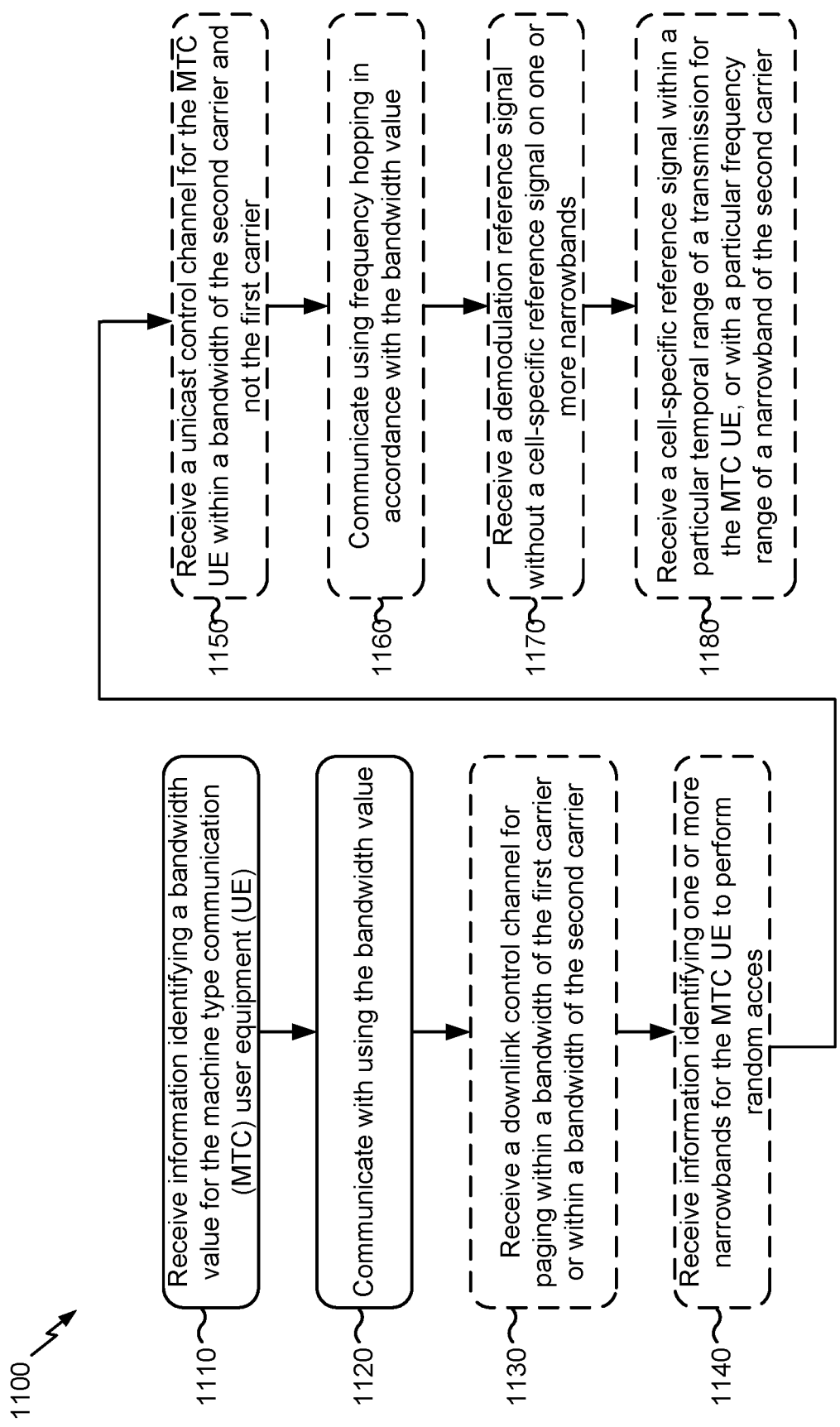
FIG. 11 is a flow chart of a method of wireless communication.

FIG. 11 is a flow chart of a method 1100 of wireless communication. The method may be performed by an MTC UE (e.g., the UE 120 of FIG. 1, the apparatus 1202/1202', and/or the like). Optional steps of the method 1100 are indicated by dashed flowchart blocks in FIG. 11.

At 1110, the MTC UE (e.g., using antenna 252, DEMOD 254, MIMO detector 256, receive processor 258, controller/processor 280, and/or the like) may receive information identifying a bandwidth value for the MTC UE. For example, the bandwidth value may be a first bandwidth value when the MTC UE is configured to use a first carrier associated with a first radio access technology (e.g., LTE). The bandwidth value may be a second bandwidth value when the MTC UE is configured to use a second carrier associated with a second radio access technology (e.g., 5G). In some aspects, the first bandwidth value is signaled using a master information block contained within the first carrier. In some aspects, the second bandwidth value is signaled using a master information block contained within the first carrier or a system information block associated with MTC. In some aspects, one or more repetitions of the system information block associated with MTC are transmitted outside of a bandwidth of the first carrier and within a bandwidth of the second carrier. In some aspects, the one or more repetitions are transmitted in one or more narrowbands adjacent to the first carrier.

At 1120, the MTC UE (e.g., using antenna 252, DEMOD 254, MIMO detector 256, receive processor 258, controller/processor 280, and/or the like) may communicate using the bandwidth value. For example, the MTC UE may receive certain signals within the first carrier when the MTC UE is an LTE MTC UE. In some aspects, the user equipment may receive certain signals within the first carrier and/or the second carrier when the MTC UE is a 5G MTC UE. In some aspects, a valid subframe configuration for a narrowband outside of the bandwidth of the first carrier has a temporal granularity of less than 1 millisecond. In some aspects, a control region of the first carrier is of a different size than a control region for the second carrier. In some aspects, narrowbands in the first carrier and narrowbands in the second carrier are aligned with each other based at least in part on a shift that is applied to the narrowbands in the second carrier. In some aspects, the shift is based at least in part on a bandwidth of the first carrier and a bandwidth of the second carrier. In some aspects, the first carrier and the second carrier are centered on the same frequency, and a bandwidth of the first carrier is contained within a bandwidth of the second carrier.

At 1130, the MTC UE (e.g., using antenna 252, DEMOD 254, MIMO detector 256, receive processor 258, controller/processor 280, and/or the like) may receive a downlink control channel for paging within a bandwidth of the first carrier or within a bandwidth of the second carrier. For example, in some cases, the MTC UE may receive the downlink control channel for paging in the bandwidth of the first carrier. In other cases, the MTC UE may receive the downlink control channel for paging in the bandwidth of the second carrier and not the first carrier. This may be based at least in part on a UE identifier of the MTC UE (e.g., the 5G MTC UE).

At 1140, the MTC UE (e.g., using antenna 252, DEMOD 254, MIMO detector 256, receive processor 258, controller/processor 280, and/or the like) may receive information identifying one or more narrowbands for the MTC UE to perform random access. For example, the one or more narrowbands may be within a bandwidth of the second carrier and not the first carrier. In such a case, the MTC UE may be a 5G MTC UE.

At 1150, the MTC UE (e.g., using antenna 252, DEMOD 254, MIMO detector 256, receive processor 258, controller/processor 280, and/or the like) may receive a unicast control channel for the MTC UE within a bandwidth of the second carrier and not the first carrier. For example, the unicast control channel may be received within the bandwidth of the second carrier and not the first carrier based at least in part on the MTC UE being configured to use the second carrier (e.g., based at least in part on the MTC UE being a 5G MTC UE). In such a case, the MTC UE may receive, based at least in part on the unicast control channel, a unicast shared channel corresponding to the unicast control channel in the same carrier as the unicast control channel, within a bandwidth of the first carrier or within the bandwidth of the second carrier.

At 1160, the MTC UE (e.g., using antenna 252, DEMOD 254, MIMO detector 256, receive processor 258, controller/processor 280, and/or the like) may communicate using frequency hopping in accordance with the bandwidth value. In some aspects, when a first frequency hop is contained within a bandwidth of the first carrier, all frequency hops for the MTC UE are contained within the bandwidth of the first carrier. In some aspects, when a first frequency hop is outside of the bandwidth of the first carrier, all frequency hops for the MTC UE are outside of the bandwidth of the first carrier. In some aspects, one or more frequency hops are within a bandwidth of the first carrier and one or more frequency hops are outside of the bandwidth of the first carrier. In some aspects, at least one of a number of narrowbands for the frequency hopping or an offset between the narrowbands for the frequency hopping is different for the first carrier than for the second carrier.

At 1170, the MTC UE (e.g., using antenna 252, DEMOD 254, MIMO detector 256, receive processor 258, controller/processor 280, and/or the like) may receive a demodulation reference signal without a cell-specific reference signal (CRS) on one or more narrowbands. For example, the one or more narrowbands may be outside of a bandwidth of the first carrier. In this case, in some aspects, the MTC UE may only receive the CRS within the bandwidth of the first carrier.

At 1180, the MTC UE (e.g., using antenna 252, DEMOD 254, MIMO detector 256, receive processor 258, controller/processor 280, and/or the like) may receive a cell-specific reference signal within a temporal range of a transmission for the MTC UE, or within a frequency range of a narrowband in the second carrier. For example, when the base station identifies one or more narrowbands outside of a bandwidth of the first carrier, the MTC UE may receive a cell-specific reference signal within a particular temporal range of a transmission for the MTC UE, or within a particular frequency range of the one or more narrowbands in the second carrier.

In some aspects, the MTC UE (e.g., using antenna 252, DEMOD 254, MIMO detector 256, receive processor 258, controller/processor 280, and/or the like) may receive information identifying one or more narrowbands outside of a bandwidth of the first carrier. For example, the information may identify at least a first PRB and a number of contiguous PRBs of the one or more narrowbands. The one or more narrowbands may form the second carrier.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
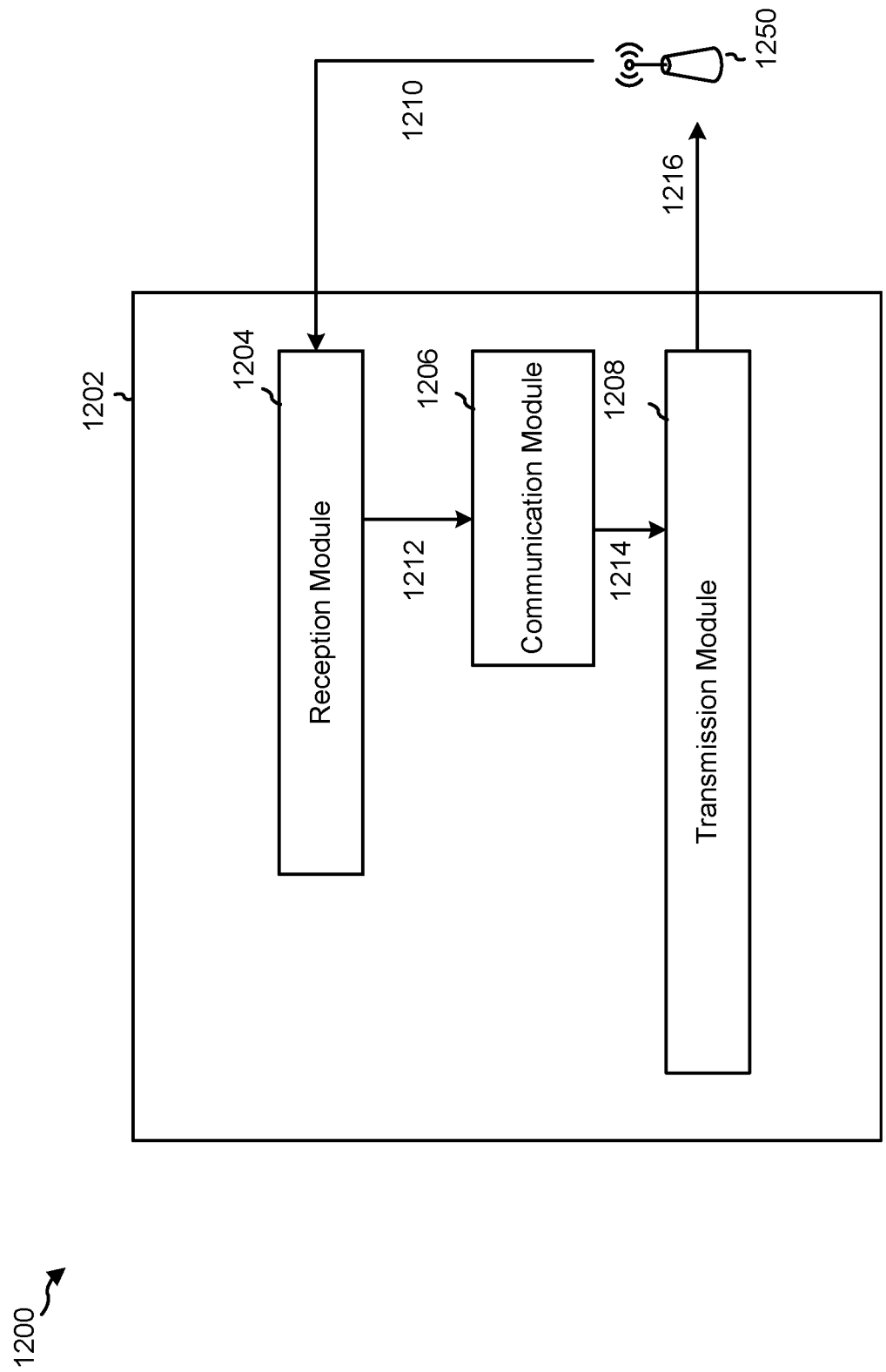
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a UE, such as an MTC UE. In some aspects, the apparatus 1202 includes a reception module 1204, a communication module 1206, and/or a transmission module 1208.

The reception module 1204 may receive signals 1210 from a base station 1250 (e.g., BS 110). The signals 1210 may be similar to the signals 912 described in connection with FIG. 9, above. The reception module 1204 may provide the signals 1210 to the communication module 1206 as data 1212. In some aspects, the data 1212 may include information identifying a bandwidth value for the apparatus 1202, a downlink control channel for paging, information identifying one or more narrowbands for the apparatus 1202 to perform random access, a unicast control channel for the apparatus 1202, a demodulation reference signal without a cell-specific reference signal on one or more narrowbands outside of a bandwidth of the first carrier, and/or the like.

The communication module 1206 may communicate with the base station 1250 using a bandwidth value that is received by the reception module 1204 and/or using frequency hopping. The communication module 1206 may communicate with the base station 1250 using reception module 1204 and/or transmission module 1208. For example, the communication module 1206 may provide data 1214 to the transmission module 1208 for transmission as signals 1216 to the base station 1250.

The apparatus may include additional modules that perform each of the blocks of the algorithm in the aforementioned method 1100 of FIG. 11 and/or the like. As such, each block in the aforementioned method 1100 of FIG. 11 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
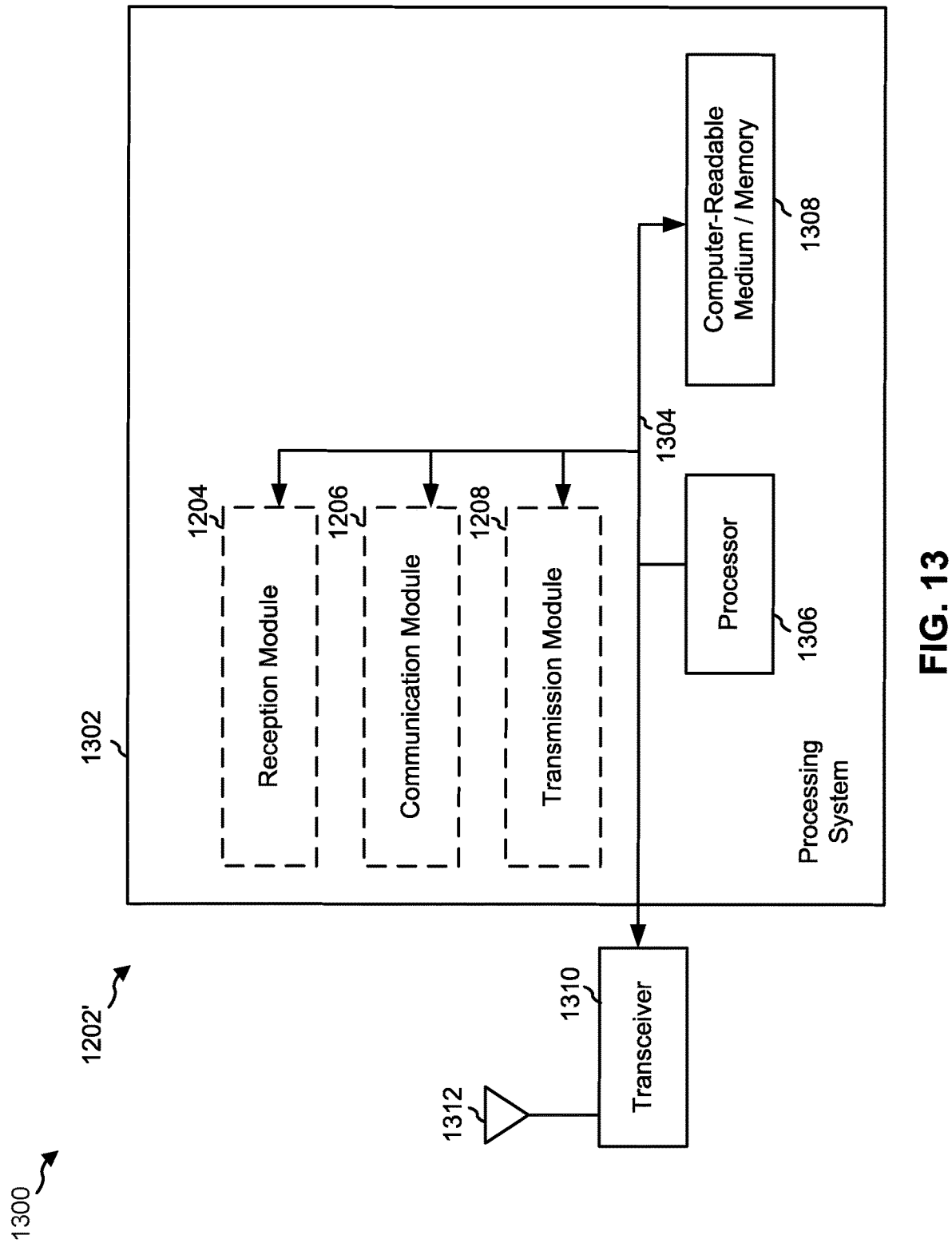
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a UE.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1208, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, and 1208. The modules may be software modules running in the processor 1306, resident/stored in the computer readable medium/memory 1308, one or more hardware modules coupled to the processor 1306, or some combination thereof. The processing system 1302 may be a component of the UE 120 and may include the memory 282 and/or at least one of the TX MIMO processor 266, the RX processor 258, and/or the controller/processor 280.

In some aspects, the apparatus 1202/1202' for wireless communication includes means for receiving information identifying a bandwidth value for the apparatus 1202/1202', wherein the bandwidth value is a first bandwidth value when the apparatus 1202/1202' is configured to use a first carrier associated with a first radio access technology and wherein the bandwidth value is a second bandwidth value when the apparatus 1202/1202' is configured to use a second carrier associated with a second radio access technology; means for communicating using the bandwidth value; means for receiving a downlink control channel for paging within a bandwidth of the first carrier or within a bandwidth of the second carrier and not the first carrier based at least in part on a UE identifier of the apparatus 1202/1202' and a capability of the apparatus 1202/1202' to use the second carrier for MTC communication; means for receiving information identifying one or more narrowbands for the apparatus 1202/1202' to perform random access, wherein the one or more narrowbands are within a bandwidth of the second carrier and not the first carrier; means for receiving a unicast control channel for the apparatus 1202/1202' within a bandwidth of the second carrier and not the first carrier, wherein the unicast control channel is transmitted within the bandwidth of the second carrier and not the first carrier based at least in part on the apparatus 1202/1202' being configured to use the second carrier; means for communicating using frequency hopping, wherein, when a first frequency hop is contained within a bandwidth of the first carrier, all frequency hops for the apparatus 1202/1202' are contained within the bandwidth of the first carrier, and when a first frequency hop is outside of the bandwidth of the first carrier, all frequency hops for the apparatus 1202/1202' are outside of the bandwidth of the first carrier; means for communicating using frequency hopping, wherein one or more frequency hops are within a bandwidth of the first carrier and one or more frequency hops are outside of the bandwidth of the first carrier; means for communicating using frequency hopping, wherein at least one of a number of narrowbands for the frequency hopping or an offset between the narrowbands for the frequency hopping is different for the first carrier than for the second carrier; means for receiving a demodulation reference signal without a cell-specific reference signal on one or more narrowbands outside of a bandwidth of the first carrier; and means for receiving a cell-specific reference signal within a particular temporal range of a transmission for the apparatus 1202/1202', or with a particular frequency range of a narrowband of the second carrier, based at least in part on identifying one or more narrowbands outside of a bandwidth of the first carrier. The aforementioned means may be one or more of the aforementioned modules of the apparatus 1202 and/or the processing system 1302 of the apparatus 1202' configured to perform the functions recited by the aforementioned means. As described supra, the processing system 1302 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 13 is provided as an example. Other examples may differ from what is described in connection with FIG. 13.

It should be understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The description herein is provided in order to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a network entity, comprising:
    transmitting a bandwidth value for a machine type communication (MTC) user equipment (UE), wherein the bandwidth value is a first bandwidth value when the MTC UE is configured to use a first carrier associated with a first radio access technology and wherein the bandwidth value is a second bandwidth value when the MTC UE is configured to use a second carrier associated with a second radio access technology; and
    communicating with the MTC UE using the bandwidth value,
        wherein communicating with the MTC UE using the bandwidth value further comprises:
            communicating with the MTC UE using frequency hopping, wherein at least one of a number of narrowbands for the frequency hopping or an offset between the narrowbands for the frequency hopping is different for the first carrier than for the second carrier.

2. The method of claim 1, wherein the first bandwidth value is signaled using a master information block contained within the first carrier.

3. The method of claim 1, wherein the second bandwidth value is signaled using a master information block contained within the first carrier or a system information block associated with MTC.

4. The method of claim 1, further comprising:
    transmitting information identifying one or more repetitions of a system information block associated with MTC, wherein the one or more repetitions are transmitted outside of a bandwidth of the first carrier and within a bandwidth of the second carrier, and wherein the information identifying the one or more repetitions is signaled using a master information block contained within the first carrier.

5. The method of claim 4, wherein the one or more repetitions are transmitted in one or more narrowbands adjacent to the first carrier.

6. The method of claim 1, wherein communicating with the MTC UE further comprises:
transmitting a downlink control channel for paging within a bandwidth of the first carrier or within a bandwidth of the second carrier and not the first carrier based at least in part on a UE identifier of the MTC UE and a capability of the MTC UE to use the second carrier for MTC communication.

7. The method of claim 1, further comprising:
transmitting information identifying one or more narrowbands for the MTC UE to perform random access, wherein the one or more narrowbands are within a bandwidth of the second carrier and not the first carrier.

8. The method of claim 1, further comprising:
transmitting a unicast control channel for the MTC UE within a bandwidth of the second carrier and not the first carrier, wherein the unicast control channel is transmitted within the bandwidth of the second carrier and not the first carrier based at least in part on the MTC UE being configured to use the second carrier.

9. The method of claim 8, further comprising:
transmitting, based at least in part on the unicast control channel, a unicast shared channel corresponding to the unicast control channel in the same carrier as the unicast control channel, within a bandwidth of the first carrier or within the bandwidth of the second carrier.

10. The method of claim 1, wherein,
when communicating with the MTC UE using the frequency hopping, when a first frequency hop is contained within a bandwidth of the first carrier, all frequency hops for the MTC UE are contained within the bandwidth of the first carrier, and when the first frequency hop is outside of the bandwidth of the first carrier, all frequency hops for the MTC UE are outside of the bandwidth of the first carrier.

11. The method of claim 1,
wherein one or more frequency hops are within a bandwidth of the first carrier and one or more frequency hops are outside of the bandwidth of the first carrier.

12. The method of claim 1, wherein communicating with the MTC UE using the bandwidth value further comprises:
transmitting a demodulation reference signal without a cell-specific reference signal on one or more narrowbands outside of a bandwidth of the first carrier.

13. The method of claim 1, wherein communicating with the MTC UE using the bandwidth value further comprises:
transmitting a cell-specific reference signal within a temporal range of a transmission for the MTC UE, or with a frequency range of a narrowband in the second carrier, based at least in part on identifying one or more narrowbands outside of a bandwidth of the first carrier.

14. The method of claim 1, wherein first narrowbands in the first carrier and second narrowbands in the second carrier are aligned with each other based at least in part on a shift that is applied to the second narrowbands in the second carrier.

15. The method of claim 14, wherein the shift is based at least in part on a bandwidth of the first carrier and a bandwidth of the second carrier.

16. The method of claim 1, wherein the first carrier and the second carrier are centered on a same frequency, and a bandwidth of the first carrier is within a bandwidth of the second carrier.

17. The method of claim 1, wherein, when the bandwidth value is the second bandwidth value, transmitting the bandwidth value further comprises: transmitting information identifying one or more narrowbands outside of a bandwidth of the first carrier, wherein the information indicates at least a first physical resource block (PRB) and a number of continuous PRBs.

18. The method of claim 17, wherein a valid subframe configuration for a narrowband, of the one or more narrowbands outside of the bandwidth of the first carrier, has a temporal granularity of less than 1 millisecond.

19. The method of claim 1, wherein a control region of the first carrier is of a different size than a control region for the second carrier.

20. A method of wireless communication performed by a machine type communication (MTC) user equipment (UE), comprising:
receiving information identifying a bandwidth value for the MTC UE, wherein the bandwidth value is a first bandwidth value when the MTC UE is configured to use a first carrier associated with a first radio access technology and wherein the bandwidth value is a second bandwidth value when the MTC UE is configured to use a second carrier associated with a second radio access technology; and
communicating using the bandwidth value,
wherein communicating using the bandwidth value comprises:
communicating using frequency hopping in accordance with the bandwidth value, wherein at least one of a number of narrowbands for the frequency hopping or an offset between the narrowbands for the frequency hopping is different for the first carrier than for the second carrier.

21. The method of claim 20, wherein the first bandwidth value is received in a master information block contained within the first carrier.

22. The method of claim 20, wherein the second bandwidth value is signaled using a master information block contained within the first carrier or a system information block associated with MTC.

23. The method of claim 22, wherein one or more repetitions of the system information block associated with MTC are received outside of a bandwidth of the first carrier and within a bandwidth of the second carrier.

24. The method of claim 20, wherein communicating using the bandwidth value further comprises:
receiving a downlink control channel for paging within a bandwidth of the first carrier or within a bandwidth of the second carrier and not the first carrier based at least in part on a UE identifier of the MTC UE and a capability of the MTC UE to use the second carrier for MTC communication.

25. The method of claim 20, further comprising:
receiving information identifying one or more narrowbands for the MTC UE to perform random access, wherein the one or more narrowbands are within a bandwidth of the second carrier and not the first carrier.

26. The method of claim 20, further comprising:
receiving a unicast control channel for the MTC UE within a bandwidth of the second carrier and not the first carrier, wherein the unicast control channel is transmitted within the bandwidth of the second carrier and not the first carrier based at least in part on the MTC UE being configured to use the second carrier.

27. A network entity for wireless communication, comprising:
  memory; and
  one or more processors coupled to the memory and configured to:
    transmit a bandwidth value for a machine type communication (MTC) user equipment (UE), wherein the bandwidth value is a first bandwidth value when the MTC UE is configured to use a first carrier associated with a first radio access technology and wherein the bandwidth value is a second bandwidth value when the MTC UE is configured to use a second carrier associated with a second radio access technology; and
    communicate with the MTC UE using the bandwidth value,
      wherein communicating with the MTC UE using the bandwidth value further comprises:
        communicating with the MTC UE using frequency hopping, wherein at least one of a number of narrowbands for the frequency hopping or an offset between the narrowbands for the frequency hopping is different for the first carrier than for the second carrier.

28. The network entity of claim 27, wherein the one or more processors are further configured to:
  transmit information identifying one or more repetitions of a system information block associated with MTC, wherein the one or more repetitions are transmitted outside of a bandwidth of the first carrier and within a bandwidth of the second carrier, and wherein the information identifying the one or more repetitions is signaled using a master information block contained within the first carrier.

29. A user equipment for wireless communication, comprising:
  memory; and
  one or more processors coupled to the memory and configured to:
    receive information identifying a bandwidth value for the user equipment, wherein the bandwidth value is a first bandwidth value when the user equipment is configured to use a first carrier associated with a first radio access technology and wherein the bandwidth value is a second bandwidth value when the user equipment is configured to use a second carrier associated with a second radio access technology; and
    communicate using the bandwidth value,
      wherein communicating using the bandwidth value comprises:
        communicating using frequency hopping in accordance with the bandwidth value, wherein at least one of a number of narrowbands for the frequency hopping or an offset between the narrowbands for the frequency hopping is different for the first carrier than for the second carrier.

30. The user equipment of claim 29, wherein the first bandwidth value is received in a master information block contained within the first carrier, and
  wherein the second bandwidth value is signaled using the master information block contained within the first carrier or a system information block associated with MTC.

* * * * *